United States Patent
Saxena et al.

(10) Patent No.: US 9,453,944 B2
(45) Date of Patent: Sep. 27, 2016

(54) POLYMERIZABLE AMIDO-CONTAINING ORGANOSILICON COMPOUNDS, SILICON-CONTAINING POLYMERS AND BIOMEDICAL DEVICES THEREFROM

(71) Applicants: Anubhav Saxena, Bangalore (IN); Shreedhar Bhat, Bangalore (IN); Kenrick M. Lewis, Flushing, NY (US)

(72) Inventors: Anubhav Saxena, Bangalore (IN); Shreedhar Bhat, Bangalore (IN); Kenrick M. Lewis, Flushing, NY (US)

(73) Assignee: Momentive Performance Materials Inc., Waterford, NY (US)

( * ) Notice: Subject to any disclaimer, the term of this patent is extended or adjusted under 35 U.S.C. 154(b) by 0 days.

(21) Appl. No.: 14/492,530

(22) Filed: Sep. 22, 2014

(65) Prior Publication Data

US 2015/0011670 A1 Jan. 8, 2015

Related U.S. Application Data

(63) Continuation of application No. PCT/US2013/029327, filed on Mar. 6, 2013.

(60) Provisional application No. 61/614,212, filed on Mar. 22, 2012.

(51) Int. Cl.
*G02B 1/04* (2006.01)
*C08F 283/06* (2006.01)

(52) U.S. Cl.
CPC ............. *G02B 1/043* (2013.01); *C08F 283/06* (2013.01)

(58) Field of Classification Search
CPC .............................. G02B 1/043; C08L 33/24
USPC ...................... 523/107; 528/14, 28
See application file for complete search history.

(56) References Cited

U.S. PATENT DOCUMENTS

| | | | |
|---|---|---|---|
| 3,408,429 A | 10/1968 | Wichterle | |
| 3,496,254 A | 2/1970 | Wichterle | |
| 4,084,459 A | 4/1978 | Clark | |
| 4,197,266 A | 4/1980 | Clark et al. | |
| 4,260,725 A | 4/1981 | Keogh et al. | |
| 4,450,264 A | 5/1984 | Cho | |
| 4,847,398 A | 7/1989 | Mehta et al. | |
| 4,857,583 A | 8/1989 | Austin et al. | |
| 5,159,096 A | 10/1992 | Austin et al. | |
| 5,191,103 A | 3/1993 | Mehta et al. | |
| 5,352,714 A | 10/1994 | Lai et al. | |
| 5,698,627 A * | 12/1997 | Oguni | D21H 17/37 524/547 |
| 5,998,498 A | 12/1999 | Vanderlaan et al. | |
| 6,013,711 A | 1/2000 | Lewis et al. | |
| 6,207,782 B1 | 3/2001 | Czech et al. | |
| 6,867,245 B2 | 3/2005 | Iwata et al. | |
| 7,956,131 B2 | 6/2011 | Arnold et al. | |
| 7,960,447 B2 | 6/2011 | Schorzman et al. | |
| 8,415,405 B2 * | 4/2013 | Maggio | C07F 7/0854 523/107 |
| 2002/0016383 A1 * | 2/2002 | Iwata | B29D 11/00125 351/159.04 |
| 2007/0116660 A1 | 5/2007 | Kim et al. | |
| 2007/0291345 A1 | 12/2007 | Kumar et al. | |
| 2011/0181833 A1 | 7/2011 | Guyer et al. | |
| 2011/0237766 A1 | 9/2011 | Maggio et al. | |
| 2011/0275734 A1 | 11/2011 | Scales et al. | |

FOREIGN PATENT DOCUMENTS

| | | |
|---|---|---|
| EP | 1716436 B1 | 4/2011 |
| WO | 8400763 A1 | 3/1984 |
| WO | 2010056687 A2 | 5/2010 |
| WO | 2011037893 A2 | 3/2011 |

OTHER PUBLICATIONS

Patent Cooperation Treaty (PCT), International Search Report and Written Opinion for Application PCT/US13/29327 filed Mar. 6, 2013, mailed May 20, 2013,10 pp., International Searching Authority, US.

* cited by examiner

*Primary Examiner* — Tae H Yoon
(74) *Attorney, Agent, or Firm* — Joseph Waters; McDonald Hopkins LLC

(57) ABSTRACT

There is provided a fast curing composition comprising an alpha, beta-unsaturated amido-containing organosilicon compound, useful in making water absorbing silicone-hydrogel films for biomedical devices, such as contact lens, and a process for producing these monomers. This invention also provides for hydrogels made from the alpha, beta-unsaturated amido-containing organosilicon compound described herein.

37 Claims, No Drawings

POLYMERIZABLE AMIDO-CONTAINING ORGANOSILICON COMPOUNDS, SILICON-CONTAINING POLYMERS AND BIOMEDICAL DEVICES THEREFROM

CROSS REFERENCE TO RELATED APPLICATIONS

This application is a continuation of International Patent Application No.: PCT Application No. PCT/US2013/029327, entitled "Polymerizable Amido-Containing Organosilicon Compounds, Silicon-Containing Polymers and Biomedical Devices Therefrom", filed on Mar. 6, 2013, which claims the priority benefit of U.S. Provisional Patent Application No. 61/614,212 entitled "Polymerizable Amido-Containing Organosilicon Compounds, Silicon-Containing Polymers and Biomedical Devices Therefrom", filed on Mar. 22, 2012, each of which are hereby incorporated in their entirety by reference.

FIELD OF THE INVENTION

The present invention provides fast curable, alpha, beta-unsaturated amido-containing organosilicon compositions useful for the production of biomedical devices, especially contact lenses, therefrom.

BACKGROUND OF THE INVENTION

Contact lenses with the object of continuous wear for a long term are made of silicone rubber prepared from poly-dimethyl siloxanes. High water content contact lenses are made of poly-N-vinylpyrrolidone polymers. Since the silicone rubber contact lenses are very water-repellent and greatly different from the cornea in thermal properties such as thermal conductivity and thermal diffusivity, they give a foreign body sensation, particularly a burning sensation despite having oxygen permeability. Contact lenses made from silicone rubber are uncomfortable to wear. Further, the silicone rubber is soft and elastic, making it difficult to conduct precise mechanical treatments such as cutting, grinding, and polishing. Many attempts for making the surface of silicone rubber lenses hydrophilic have been undertaken, but no completely satisfactory contact lens has been developed. Since the high water content contact lenses contain about 60% to about 80% by weight of water, they have the disadvantages that they are weaker in quality of material than low water content contact lenses, are easily contaminated with inorganic and organic compounds in tears which penetrate and accumulate into the lenses during the use, and are bad in maintenance of lens contour due to the evaporation of water during the use and, therefore, the refractive power thereof easily changes.

Conventional hydrogel materials made from 2-hydroxyethylmethacrylate (HEMA) have poor oxygen permeability and poor oxygen transport to the eye through the absorbed water molecules. Water has low oxygen permeability. Contact lenses made from 2-hydroxyethylmethacrylate monomers are slowly dehydrated and the amount of oxygen transported to the cornea is reduced upon exposure to atmospheric air for longer periods. Eye irritation, redness and other corneal complications can result and hence restrict use of the lenses to limited periods of wear.

Silicone-hydrogel films are used to make extended wear soft contact lenses due to their high oxygen permeability, flexibility, comfort and reduced corneal complications. Silicone-hydrogels have overcome some of the obstacles for long periods of wear beyond conventional hydrogels because these silicone-hydrogels make comfortable soft contact lenses with higher oxygen permeability than the conventional hydrogel materials. However, these silicone-hydrogels have deficiencies. For example, many of the silicone-hydrogels used linear blocks of dimethylpolysiloxanes to improve oxygen permeability. It is known that polysiloxanes, which contain $\alpha,\omega$-terminal unsaturated groups bonded through divalent hydrocarbon groups or amino-containing hydrocarbon groups (heterocarbon groups), have been used in preparing soft, contact lenses. Lower molecular weight unsaturated siloxane-polyether copolymers with the $\alpha,\omega$-divinylpolysiloxanes have also been used in combination with unsaturated polysiloxane-polyether copolymers and a compatibilizing additive. These polymers contain linear hydrophobic dimethylpolysiloxane chains, which form hydrophobic regions within the polymer and may cause corneal complications or difficulties in conducting precise mechanical treatments.

Methacryloxypropyltris-(trimethylsiloxy)silane monomers have been used to prepare silicone-containing hydrogels. The (meth)acryloxypropyltris-(trimethylsiloxy)silane is hydrophobic and is used in preparing polyurethane-silicone polymers. These polyurethane-silicone polymers contain blocks of hydrophobic silicone. Contact lenses made from these polymers may cause eye discomfort because of the hydrophobic regions within the polymer.

Silicone-hydrogels are typically made from acrylate or methacrylate functionalized silicone monomer that are polymerized with hydrophilic monomers, such as hydroxyethyl methacrylate (HEMA), N-vinylpyrrolidone (NVP) and other monomers such as methyl methacrylic acid (MA), and dimethylacrylamide (DMA), in the presence of crosslinker and free radical or photoinitiators. Crosslinking agents generally have two or more reactive functional groups at different sites of the molecule. Typically, these sites contain polymerizable ethylenic unsaturation groups. During polymerization to form the silicone-hydrogel, they form a covalent bond with two different polymer chains and form a stable three-dimensional network to improve the strength of the polymer. Crosslinking agents conventionally used in contact lenses include ethylene glycol dimethacrylate and trimethyloylpropane trimethacrylate. Other useful crosslinking agents include diethyleneglycol dimethacrylate, bisphenol A dimethacrylate, diglycidyl bisphenol A dimethacrylate, and dimethacrylate-terminated polyethylene glycol, and reactive linear polyether modified silicones. The oxygen permeability of these silicone-hydrogels is affected by the chemical structure of the acrylate or methacrylate functionalized silicone monomer and choice of the other monomers containing reactive carbon-carbon double bonds that are used in preparing the crosslinked polymer.

Silicone-hydrogel contact lens materials are typically made using either hydrophobic mono-functional silicone monomers or multi-functional hydrophilic silicone monomers followed by secondary surface treatment. Mono-functional silicone monomers are often used in the contact lens industry over multi-functional silicone monomers since the latter lead to increased rigidity in the lenses made therefrom. The known mono-functional silicone monomers, however, may have deficiencies. For example, monofunctional siloxane-polyether (meth)acrylates are susceptible to air oxidation. Monofunctional (meth)acryloxy functional siloxanes that contain 1,4-substitution the (meth)acryloxy group to the siloxane group on a six-member ring, such as for example, (meth)acrylic acid 2-hydroxy-4-[2-bis-(trimethylsiloxy) methylsilanyl-ethyl]-cyclohexyl ester, form highly ordered copolymers which may inhibit the permeability of oxygen through the silicone-hydrogel. 1,3-substitution of the (meth) acryloxy group to the siloxane group on a six-member ring, such as for example, (meth)acrylic acid 2-hydroxy-5-[2-bis-(trimethylsiloxy)methylsilanyl-ethyl]-cyclohexyl ester, form less order copolymers, but the moderate polarity of the (meth)acryloxy group may affect the hydrophilic properties of the silicone-hydrogel.

Although the state of the art for soft contact lenses has been improving, silicone-based materials still possess major shortfalls, like sub-optimal surface wettability and oxygen permeability, and the need for compatibilizers in preparing the polymer. In an effort to overcome these drawbacks, current state of the art technology uses either expensive secondary surface treatments called "plasma oxidation", or internal wetting agents. These approaches may decrease oxygen permeability or require the use of compatibilizers, which adds costs during the manufacturing process.

Hence, there remains a need for hydrophilic silicone monomers with inherently advantageous wettability, stability to air oxidation, high oxygen permeability and high solubility in the other reactive monomers used to make the polymer without the need for compatibilizers. The polymerizable, amido-containing organosilicon compounds of the present invention, in which an alpha, beta-unsaturated amido group is linked to the silicon atom through a hydroxycycloalkylene-containing group, can be used to make contact lenses with improved wettability, oxidative instability, oxygen permeability, and without the need for the expensive surface treatments, processing costs associated with using compatibilizers or the less hydrophilic silicone containing monomers of the present art.

SUMMARY

The present invention discloses compositions comprising an alpha, beta-unsaturated amido-containing organosilicon compound having the structure of Formula (I):

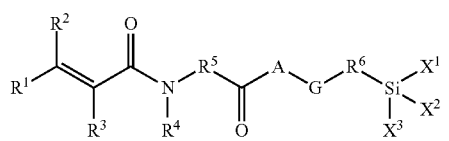

wherein:

$R^1$, $R^2$, and $R^3$ are independently chosen from hydrogen, an alkyl group containing from 1 to 3 carbon atoms, a phenyl group, or a $R^7C(=O)OR^8$ group, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen, an alkyl group containing from 1 to 6 carbon atoms, or a phenyl group;

$R^5$ an alkylene, containing from 1 to 16 carbon atoms and optionally a heteroatom of oxygen, sulfur, nitrogen, or a combination of two or more thereof;

A is oxygen or sulfur;

G is a hydroxyl-substituted cyclohexylene group;

$R^6$ is a chemical bond or an alkylene group containing from 1 to 16 carbon atoms and optionally a heteroatom of oxygen, sulfur, nitrogen, or a combination of two or more thereof;

$X^1$ is a methyl, trimethylsiloxy, or $-O[Si(CH_3)_2O-]_n$, wherein n is an integer of from 1 to 9;

$X^2$ is methyl, trimethylsiloxy, or $-[OSi(CH_3)_2]_mG^1$, wherein $G^1$ is $(CH_3)_3SiO-$ or an alpha, beta-unsaturated amido containing group with the general formula:

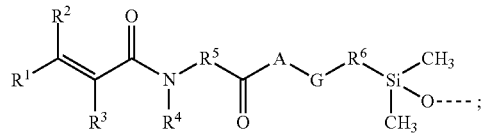

and m is 0 to 200, with the proviso that when $X^2$ is $-[OSi(CH_3)_2]_mG^1$, then $X^1$ and $X^3$ are methyl;

$X^3$ is methyl, trimethylsiloxy, $(CH_3)_3SiCH_2CH_2-$, $(CH_3)_3SiCH_2CH_2Si(CH_3)_2O-$, or $-OSi(CH_3)_2$, with the provisos that (i) when $X^1$ is $-O[Si(CH_3)_2O-]_n$, then $X^3$ is $-OSi(CH_3)_2$ and $X^1$ forms a chemical bond with the $X^3$ to form a divalent $-X^1-X^3-$ group that is bonded to the silicon atom to form a cyclic polysiloxane ring, (ii) when $X^3$ is $-OSi(CH_3)_2$, then $X^1$ is $-O[Si(CH_3)_2O-]_n$ and $X^1$ forms a chemical bond with the $X^3$ to form a divalent $-X^1-X^3-$ group, which is bonded to the silicon atom to form a cyclic polysiloxane ring.

These alpha, beta-unsaturated amido-containing organosilicon compounds are useful for making polymers and water-absorbing, oxygen-permeable silicone-hydrogel films containing the same that can be fashioned into biomedical devices, especially extended wear soft contact lenses.

The alpha, beta-unsaturated amido-containing organosilicon compounds having the general Formula (I) and compositions are made by reacting these polymerizable, alpha, beta-unsaturated amido-containing organosilicon compounds with hydrophilic monomers containing an activated carbon-carbon double bond.

DETAILED DESCRIPTION OF THE INVENTION

In accordance with the present invention, the compositions comprising of alpha, beta-unsaturated amido-containing organosilicon compounds having the structure of Formula (I):

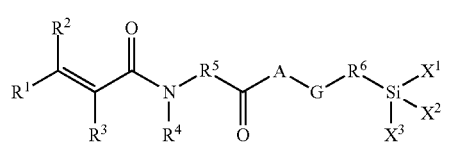

wherein:

$R^1$, $R^2$, and $R^3$ are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen or an alkyl group containing from 1 to 6 carbon atoms or phenyl;

$R^5$ is an alkylene group containing from 1 to 16 carbon atoms and optionally a heteroatom of oxygen, sulfur, or nitrogen, or a combination of two or more thereof;

A is oxygen or sulfur;

G is a hydroxyl-substituted cyclohexylene group;

$R^6$ is a chemical bond or an alkylene group containing from 1 to 16 carbon atoms and optionally a heteroatom of oxygen, sulfur, nitrogen, or a combination of two or more thereof;

$X^1$ is a methyl, trimethylsiloxy, or —O[Si(CH$_3$)$_2$O—]$_n$ wherein n is an integer of from 1 to 9;

$X^2$ is methyl, trimethylsiloxy, or —[OSi(CH$_3$)$_2$]$_m$G$^1$, wherein G$^1$ is (CH$_3$)$_3$SiO— or alpha, beta-unsaturated amido containing group with the general formula:

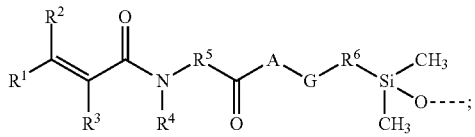

and m is 0 to 200, with the proviso that when $X^2$ is —[OSi(CH$_3$)$_2$]$_m$G$^1$, then $X^1$ and $X^3$ are methyl;

$X^3$ is methyl, trimethylsiloxy, (CH$_3$)$_3$SiCH$_2$CH$_2$—, (CH$_3$)$_3$SiCH$_2$CH$_2$Si(CH$_3$)$_2$O— or —OSi(CH$_3$)$_2$, with the provisos that (i) when $X^1$ is —O[Si(CH$_3$)$_2$O—]$_n$, then $X^3$ is —OSi(CH$_3$)$_2$ and $X^1$ forms a chemical bond with the $X^3$ to form a divalent —$X^1$-$X^3$— group, which is bonded to the silicon atom to form a cyclic polysiloxane ring, (ii) when $X^3$ is —OSi(CH$_3$)$_2$, then $X^1$ is —O[Si(CH$_3$)$_2$O—]$_n$ and $X^1$ forms a chemical bond with the $X^3$ to form a divalent —$X^1$-$X^3$— group, which is bonded to the silicon atom to form a cyclic polysiloxane ring.

Representative and non-limiting examples of $R^1$, $R^2$, and $R^3$ include hydrogen, methyl, ethyl, 2-methylethyl, propyl, 2-methylpropyl, carboxy, carboxymethyl, carboxyethyl, methoxycarbonylmethyl, and ethoxycarbonylethyl. Representative and non-limiting examples of $R^4$ include hydrogen, methyl, or ethyl. Representative examples of $R^5$ and $R^6$ include methylene, ethylene, 2-methyl-ethylene, propylene, 2-methylpropylene, and butylene. Representative and non-limiting examples of G include 2-hydroxy-1,4-cyclohexylene, 2-hydroxy-1,5-cyclohexylene, and 4-hydroxy-1,3-cyclohexylene.

In another embodiment, the alpha, beta-unsaturated amido-containing organosilicon compounds are compounds having the general Formula (I) wherein each $R^1$ and $R^2$ is hydrogen, $R^3$ is hydrogen or methyl, $R^4$ is hydrogen or methyl, A is oxygen, and $R^6$ is a chemical bond, methylene, 1,2-ethylene, 1,3-propylene, 1,2-propylene, 1,3-butylene, and 1,4-butylene. In still another embodiment, $X^1$ is methyl or trimethylsiloxy and, $X^2$ is methyl or trimethylsiloxy, and $X^3$ is trimethylsiloxy, dimethyl-(2-trimethylsilanyl-ethyl)-silanyl, or dimethyl-(2-trimethylsilanyl-ethyl)-silanyloxy, more particularly, $X^1$ is methyl or trimethylsiloxy, $X^2$ is methyl, and $X^3$ is trimethylsiloxy or dimethyl-(2-trimethylsilanyl-ethyl)-silanyloxy.

Representative and non-limiting examples of the alpha, beta-unsaturated amido-containing organosilicon compounds include (acryloylamino)-acetic acid 2-hydroxy-5-[2-bis-(trimethylsiloxy)methylsilanyl-ethyl]-cyclohexyl ester; 3-(acryloylamino)-propionic acid 2-hydroxy-5-[2-bis-(trimethylsiloxy)methylsilanyl-ethyl]-cyclohexyl ester; (2-methyl-acryloylamino)-acetic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 2-methyl-acrylic acid 2-hydroxy-5-bis-(trimethylsiloxy)methylsilanyl-cyclohexyl ester; 9-(3-methoxycarbonyl-acryloylamino)-nonanoic acid 2-hydroxy-5-[3-bis-(trimethylsiloxy)methylsilanyl-propyl]-cyclohexyl ester; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid methyl ester; 3-{2-[2-hydroxy-5-[bis-(3-trimethylsiloxy)methylsilanyl-propyl]-cyclohexyloxycarbonyl]-ethylcarbamoyl}-acrylic acid methyl ester; acryloylamino-acetic acid 2-hydroxy-5-[2-tris-(trimethylsiloxy)silanyl-ethyl]-cyclohexyl ester; 3-(acryloylamino)-propionic acid 2-hydroxy-5-[2-tris-(trimethylsiloxy)silanyl-ethyl]-cyclohexyl ester; (2-methyl-acryloylamino)-acetic acid 2-hydroxy-5-[2-tris-(trimethylsiloxy)silanyl-ethyl]-cyclohexyl ester; 2-methyl-acrylic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(3-methoxycarbonyl-acryloylamino)-nonanoic acid 2-hydroxy-5-[3-tris-(trimethylsiloxy)silanyl-propyl]-cyclohexyl ester; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid methyl ester; 3-{2-[2-hydroxy-5-[3-tris-(trimethylsiloxy)silanyl-propyl]-cyclohexyloxycarbonyl]-ethylcarbamoyl}-acrylic acid methyl ester; acryloylamino-acetic acid 2-hydroxy-5-{2-[1,1,3,3-tetramethyl-3-(2-trimethylsilanyl-ethyl)-disiloxanyl]-ethyl}cyclohexyl ester; (2-methylacryloylamino)-acetic acid 2-hydroxy-5-{2-[1,1,3,3-tetramethyl-3-(2-trimethylsilanyl-ethyl)-disiloxanyl]-ethyl}cyclohexyl ester; acryloylamino-acetic acid 2-hydroxy-5-{2-[dimethyl-(2-trimethylsilanyl-ethyl)-silanyl]-ethyl}-cyclohexyl ester; (2-methylacryloylamino)-acetic acid 2-hydroxy-5-{2-[dimethyl-(2-trimethylsilanyl-ethyl)-silanyl]-ethyl}-cyclohexyl ester; acryloylamino-acetic acid 2-hydroxy-5-[2-(2,4,4,6,6-pentamethyl-[1,3,5,2,4,6]trioxatrisilinan-2-yl)-ethyl]-cyclohexyl ester; (2-methyl-acryloylamino-acetic acid 2-hydroxy-5-[2-(2,4,4,6,6-pentamethyl-[1,3,5,2,4,6]trioxatrisilinan-2-yl)-ethyl]-cyclohexyl ester; acryloylamino-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester, (2-methyl-acryloylamino)-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester; acryloylamino-acetic acid 4-[dimethyl-(2-trimethylsilanyl-ethyl)-silanyl]-2-hydroxy-cyclohexyl ester, acryloylamino-acetic acid 4-[1,1,3,3-tetramethyl-3-(2-trimethylsilanyl-ethyl)-disiloxanyl]-2-hydroxy-cyclohexyl ester; acryloylamino-acetic acid 4-[2,4,4,6,6,8,8-heptamethyl-[1,3,5,7,2,4,6,8]tetroxatetrasilocan-2-yl]-2-hydroxy-cyclohexyl ester; and acryloylamino-acetic acid 4-[tris-(trimethylsiloxy)silanyl]-2-hydroxy-cyclohexyl ester.

In one embodiment, the stereochemistry of the alpha, beta-unsaturated amido group to the silyl group is 1,3-substitution of the cycloalkylene linking group. Although not to be held to any theory, the 1,3-substitution of the cycloalkylene group is believed to introduce more randomness (entropy) into the polymer containing the monomer of the present invention, thereby introducing a large free volume and better oxygen permeability.

Representative and non-limiting examples of alpha, beta-unsaturated amido-containing organosilicon compounds in which the alpha, beta-unsaturated amido group and the silyl group are substituted in the 1,3-positions on the cycloalkylene linking group include acryloylamino-acetic acid 2-hydroxy-5-[bis-(2-trimethylsiloxy)methylsilanyl-ethyl]-cyclohexyl ester; (2-methyl-acryloylamino)-acetic acid 2-hydroxy-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid 2-hydroxy-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsilanyl-ethyl)-disiloxanyl]-ethyl}-cyclohexyl ester; (2-methyl-acryloylamino)-acetic acid 2-hydroxy-5-{2-[1,1,3,3-tetramethyl-3-(2-trimethylsilanyl-ethyl)-disiloxanyl]-ethyl}-cyclohexyl ester; acryloylamino-acetic acid 2-hydroxy-5-{2-[dimethyl-(2-trimethylsilanyl-ethyl)-silanyl]-ethyl}-cyclohexyl ester; (2-methyl-acryloylamino)-acetic acid 2-hydroxy-5-{2-[dimethyl-(2-trimethylsilanyl-ethyl)-silanyl]-ethyl}-cyclohexyl ester; acryloylamino-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester and (2-methyl-acryloylamino)-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester.

In an exemplary embodiment, the stereochemistry of the alpha, beta-unsaturated amido group and the silyl group is in a trans-1,3-substitution on the cycloalkylene linking group, as illustrated by with the structure having Formula (II):

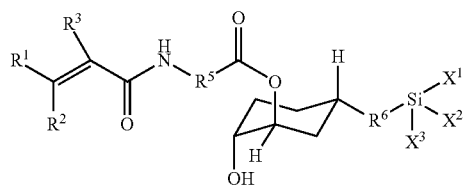

(II)

wherein:

$R^1$, $R^2$, and $R^3$ are independently chosen from is hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen, an alkyl group containing from 1 to 6 carbon atoms, or a phenyl group;

$R^5$ is an alkylene group containing from 1 to 16 carbon atoms and optionally a heteroatom of oxygen, sulfur, nitrogen or a combination of two or more thereof;

A is oxygen, nitrogen, or sulfur;

G is a hydroxyl-substituted cyclohexylene group;

$R^6$ is a chemical bond or an alkylene group containing from 1 to 16 carbon atoms and optionally a heteroatom of oxygen, sulfur, or nitrogen or a combination of two or more thereof;

$X^1$ is a methyl, trimethylsiloxy, or $-O[Si(CH_3)_2O-]_n$, wherein n is an integer of from 1 to 9;

$X^2$ is methyl, or trimethylsiloxy;

$X^3$ is methyl, trimethylsiloxy, $(CH_3)_3SiCH_2CH_2-$, $(CH_3)_3SiCH_2CH_2Si(CH_3)_2O-$, or $-OSi(CH_3)_2$, with the provisos that (i) when $X^1$ is $-O[Si(CH_3)_2O-]_n$, then $X^3$ is $-OSi(CH_3)_2$ and $X^1$ forms a chemical bond with the $X^3$ to form a divalent $-X^1-X^3-$ group, which is bonded to the silicon atom to form a cyclic polysiloxane ring, (ii) when $X^3$ is $-OSi(CH_3)_2$, then $X^1$ is $-O[Si(CH_3)_2O-]_n$ and $X^1$ forms a chemical bond with the $X^3$ to form a divalent $-X^1-X^3-$ group, which is bonded to the silicon atom to form a cyclic polysiloxane ring.

In the chemical structure given by Formula (II), the carbon atom on the ring to which the alpha, beta-unsaturated amido-containing group is bonded is assigned the 1-position (C-1) on the ring. The alpha, beta-unsaturated amido-containing group is bonded to the C-1 carbon in an axial position of the cyclohexane ring. The hydroxyl group occupies the axial position on C-2 carbon atom of the cyclohexane ring. The stereochemistry of the hydroxyl group is trans relative to the alpha, beta-unsaturated amido-containing group. The silyl-containing group occupies an equatorial position on C-5 carbon atom of the cyclohexane ring and is trans relative to the alpha, beta-unsaturated amido-containing group.

Representative and non-limiting examples of alpha, beta-unsaturated amido-containing organosilicon compounds include acryloylamino-acetic acid trans-2-hydroxy-trans-5-[bis-(2-trimethylsiloxy)methylsilanyl-ethyl]-cyclohexyl ester; (2-methyl-acryloylamino)-acetic acid trans-2-hydroxy-trans-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid trans-2-hydroxy-trans-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsilanyl-ethyl)-disiloxanyl]-ethyl}-cyclohexyl ester; (2-methyl-acryloylamino)-acetic acid trans-2-hydroxy-trans-5-{2-[1,1,3,3-tetramethyl-3-(2-trimethylsilanyl-ethyl)-disiloxanyl]-ethyl}-cyclohexyl ester; acryloylamino-acetic acid trans-2-hydroxy-trans-5-{2-[dimethyl-(2-trimethylsilanyl-ethyl)-silanyl]-ethyl}-cyclohexyl ester; and (2-methyl-acryloylamino)-acetic acid trans-2-hydroxy-trans-5-{2-[dimethyl-(2-trimethylsilanyl-ethyl)-silanyl]-ethyl}-cyclohexyl ester; and acryloylamino-acetic acid trans-2-hydroxy-trans-5-[2-(2,4,4,6,6-pentamethyl-[1,3,5,2,4,6]trioxatrisilinan-2-yl)-ethyl]-cyclohexyl ester.

In one embodiment, the alpha, beta-unsaturated amido-containing organosilicon compound also has the general Formula (III):

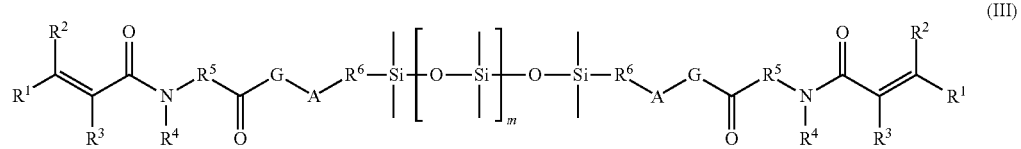

(III)

wherein:

$R^1$, $R^{2'}$ and $R^3$ are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen or an alkyl group containing from 1 to 6 carbon atoms or phenyl;

$R^5$ is an alkylene group containing from 1 to 16 carbon atoms and optionally a heteroatom of oxygen, sulfur or nitrogen;

A is oxygen, nitrogen, or sulfur;

G is a hydroxyl-substituted cyclohexylene group;

$R^6$ is a chemical bond or an alkylene group containing from 1 to 16 carbon atoms.

In particularly, the alpha, beta-unsaturated amido-containing organosilicon compound includes a mixture of stereoisomer in which at least one stereoisomer is selected from the group consisting of acryloylamino-acetic acid trans-2-hydroxy-trans-5-[bis-(2-trimethylsiloxy)methylsilanyl-ethyl]-cyclohexyl ester; (2-methyl-acryloylamino)-acetic acid trans-2-hydroxy-trans-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid trans-2-hydroxy-trans-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsilanyl-ethyl)-disiloxanyl]-ethyl}-cyclohexyl ester; (2-methyl-acryloylamino)-acetic acid trans-2-hydroxy-trans-5-{2-[1,1,3,3-tetramethyl-3-(2-trimethylsilanyl-ethyl)-disiloxanyl]-ethyl}-cyclohexyl ester; acryloylamino-acetic acid trans-2-hydroxy-trans-5-{2-[dimethyl-(2-trimethylsilanyl-ethyl)-silanyl]-ethyl}-cyclohexyl ester; and (2-methyl-acryloylamino)-acetic acid trans-2-hydroxy-trans-5-{2-[dimethyl-(2-trimethylsilanyl-ethyl)-silanyl]-ethyl}-cyclohexyl ester; or acryloylamino-acetic acid trans-2-hydroxy-trans-5-[2-(2,4,4,6,6-pentamethyl-[1,3,5,2,4,6]trioxatrisilinan-2-yl)-ethyl]-cyclohexyl ester, and wherein one of these stereoisomers is greater than 85 weight percent, even greater than 95 weight, based upon the total weight of the stereoisomers of the alpha, beta-unsaturated amido-containing organosilicon compounds present.

In one embodiment, the alpha, beta-unsaturated amido-containing organosilicon compounds having the general Formula (I) used in the present compositions comprises:

(a) reacting an oxa-bicyclo[4.1.0]heptene or alkenyl-oxa-bicyclo[4.1.0]heptane having the Formula (IV)

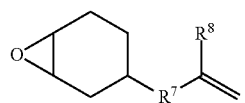

(IV)

with a hydridosilyl-containing organic compound of Formula (V):

$$H-SiX^1X^2X^3 \quad (V)$$

wherein $R^7$ is a chemical bond or an alkylene group containing from 1 to 14 carbon atoms an optionally a heteroatom of oxygen, sulfur or nitrogen; and $R^8$ is hydrogen or an alkyl group of from 1 to 6 carbon atoms, $X^1$ is a methyl, trimethylsiloxy, or $-O[Si(CH_3)_2O-]_n$ wherein n is an integer of from 1 to 9;

$X^2$ is methyl, trimethylsiloxy or $-[OSi(CH_3)_2]_mG^2$, wherein $G^2$ is $(CH_3)_3SiOSi(CH_3)_2O-$ or $H(CH_3)_2SiO-$; and m is an integer from 0 to 200, with the proviso that when $X^2$ is $-[OSi(CH_3)_2]_mG^2$, then $X^1$ and $X^3$ is methyl;

$X^3$ is methyl, trimethylsiloxy, $(CH_3)_3SiCH_2CH_2-$, $(CH_3)_3SiCH_2CH_2Si(CH_3)_2O-$ or $-OSi(CH_3)_2$, with the provisos that (i) when $X^1$ is $-O[Si(CH_3)_2O-]_n$, then $X^3$ is $-OSi(CH_3)_2$ and $X^1$ forms a chemical bond with the $X^3$ to form a divalent $-X^1-X^3-$ group, which is bonded to the silicon atom to form a cyclic polysiloxane ring, (ii) when $X^3$ is $-OSi(CH_3)_2$, then $X^1$ is $-O[Si(CH_3)_2O-]_n$ and $X^1$ forms a chemical bond with the $X^3$ to form a divalent $-X^1-X^3-$ group, which is bonded to the silicon atom to form a cyclic polysiloxane ring, and in the presence of a hydrosilylation catalyst; and (b) reacting the product of step (a) with an alpha, beta-unsaturated amido-containing acid having the Formula (VI):

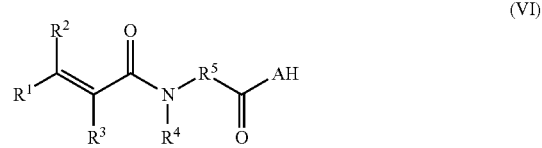

(VI)

wherein:

$R^1$, R2, and R3 are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen or an alkyl group containing from 1 to 6 carbon atoms or phenyl;

$R^5$ is an alkylene group containing from 1 to 16 carbon atoms and optionally a heteroatom of oxygen, sulfur, nitrogen, or a combination of two or more thereof; and A is oxygen or sulfur. Optionally, the reaction can be conducted in the presence of an addition catalyst to open the oxirane ring and provide for polymerizable amido-containing organosilicon compounds.

A particularly suitable stereochemistry of the alkenyl-oxa-bicyclo[4.1.0]heptane is 3-alkenyl-7-oxa-bicyclo[4.1.0]heptane, in which the oxygen atom of the oxirane ring bonded to the 1 and 6-carbon atoms of the cyclohexyl group in the C-1 equatorial and C-6 axial positions and the alkenylen group is bonded to the 3-carbon atom of the cyclohexyl ring in the equatorial position, and the 2-alkenyl-7-oxa-bicyclo[4.1.0]heptane, in which the oxygen atom of the oxirane ring bonded to the 1 and 6-carbon atoms of the cyclohexyl group in the C-1 axial and C-6 equatorial positions and the alkenyl group is bonded to the 2-carbon atom of the cyclohexyl ring in the equatorial position. These stereoisomers promote the axial attack of the nucleophile, alpha, beta-unsaturated amido-containing acid, on the epoxy ring. The stereochemistry of the alkenyl-oxa-bicyclo[4.1.0]heptane promotes the 1,3-substitution of the cyclohexyl ring with the alpha, beta-unsaturated amido-containing carboxylate group relative to the silicon-containing group.

Commercially available 3-enthenyl-7-oxa-bicyclo[4.1.0]heptane and experimentally produced 2-ethenyl-7-oxa-bicyclo[4.1.0]heptane are made from the epoxidation of 4-vinyl-cyclohexene and 2-vinyl-cyclohexene, respectively. The epoxidation of the more highly substituted carbon-carbon double bond can be achieved by treating alkene with peroxide-containing reagents, which donate a single oxygen atom. 7-Oxa-bicyclo[4.1.0]hept-3-ene is made from the epoxidation of the cyclohexa-1,4-diene. Typical peroxide reagents include hydrogen peroxide, peroxycarboxylic acids (generated in-situ or preformed), alkyl hydroperoxides and dimethyldioxirane. More specifically, the epoxidation agent is selected from the group consisting of perbenzoic acid, m-chloroperbenzoic acid, monoperphthalic acid and peracetic acid. These epoxdation agents allow for the isolation of the formed epoxide. The reaction may be carried out in an organic solvent solvent, such as chlorinated hydrocarbons, ethers or esters. Representative and non-limiting examples of the solvents include methylene chloride, chloroform, diethyl ether, tetrahydrofuran, and ethyl acetate.

The epoxidation reaction generates two stereoisomers of 3-ethenyl-7-oxa-bicyclo[4.1.0]heptane and two stereoisomers of 2-ethenyl-7-oxa-bicyclo[4.1.0]heptane. In one embodiment, the stereoisomers of 3-ethenyl-7-oxa-bicyclo[4.1.0]heptane or stereoisomers of 2-ethenyl-7-oxa-bicyclo[4.1.0]heptane are separated from each other prior to the reaction with the hydridosilyl-containing organic compound. The stereoisomers can be separated by fraction distillation, preparative gas chromatography, preparative liquid chromatography or other methods commonly used in separating stereoisomers. In one embodiment, the stereoisomers are separated using fractional distillation of the mixture of stereoisomers at elevated temperatures and at subatmospheric, atmospheric or superatmospheric pressures. In a particular embodiment, the stereoisomers are separated by fractional distillation using a rectification column having greater than 20 theoretical plates at atmospheric pressure and temperature ranging from 165° to 170° C.

In one embodiment, the 3-ethenyl-7-oxa-bicyclo[4.1.0]heptane, which has the oxygen atom of the oxirane ring bonded to the 1 and 6-carbon atoms of the cyclohexyl group in the C-1 equatorial and C-6 axial positions and has the vinyl group bonded to the 3-carbon atom of the cyclohexyl ring in the equatorial position, is greater than 85 weight percent, and can be even greater than 95 weight percent, based upon the total weight of the two stereoisomers. Similarly, in one embodiment, the 2-ethenyl-7-oxa-bicyclo[4.1.0]heptane, which has the oxygen atom of the oxirane ring bonded to the 1 and 6-carbon atoms of the cyclohexyl group in the C-1 axial and C-6 equatorial positions and has the vinyl group bonded to the 2-carbon atom of the cyclohexyl ring in the equatorial position is greater than 85 weight percent, and even greater than 95 weight percent, based upon the total weight of the two stereoisomers.

The hydridosilyl-containing organic compounds may be prepared by a variety of methods. For example, 1,1,1,2,3,3-heptamethyl-trisiloxane may be prepared by a variety of methods, including hydrolysis and condensation of trimethylchorosilane and methyldichlorosilane followed by separation of the product or equilibration of hexamethyldisiloxane with a silanic silicone fluids and separation of the desired product using fractional distillation. Further purification, such as redistillation, is often used to prepare high purity 1,1,1,2,3,3,3-heptamethyl-trisiloxane (normal boiling point 142° C.), free of higher molecular weight oligomers and hexamethyldisiloxane. Similarly, the tris-(trimethylsiloxy)hydridosilane may be prepared from the hydrolysis and condensation of trimethylchlorosilane and trichlorosilane followed by separation of the product or equilibration of hexamethyldisiloxane with trichlorosilane and separation of the desired product using fractional distillation. The 1-dim-ethylsilanyl-2-trimethylsilanyl-ethane is prepared from the hydrosilylation of dimethylchlorosilane with trimethyl-vinyl-silane in the presence of a hydrosilylation catalyst, followed by the reduction of 1-(chloro-dimethyl-silanyl)-2-trimethylsilanyl-ethane with a hydride donating reagent, such as sodium hydride, lithium aluminum hydride, and the like. 1,1,3,3-Tetramethyl-1-(2-trimethylsilanyl-ethyl)-disiloxane may be prepared by the reaction of 1,1,3,3-tetramethyl-disiloxane with trimethyl-vinyl-silane in the presence of a hydrosilylation catalyst. 2,2,4,4,6-Pentamethyl-[1,3,5,2,4,6]trioxatrisilinane is prepared by hydrolysis and condensation dimethyldichorosilane and methyldichlorosilane followed by separation of the product using fractional distillation.

The hydrosilylation reaction between hydridosilyl-containing organic compound of Formula (III) and alkenyl-oxa-bicyclo[4.1.0]heptane or oxa-bicyclo[4.1.0]heptene is conducted in the presence of a hydrosilylation catalyst, especially noble metal hydrosilylation catalysts. The catalysts include platinum, palladium, ruthenium, iridium and rhodium, as well as compounds containing these metals, such as metal complexes or metal salts. These catalysts may be supported on activated carbon, aluminum oxide, ceramic materials and the like or in a colloidal suspension often formed in situ by the reduction of metal salts. Homogeneous catalysts are particularly suitable, including chloroplatinic acid dissolved in ethanol, isopropanol or octanol and the platinum(0)-1,3-divinyl-1,1,3,3-tetramethyldisiloxane complex, known as Karstedt catalyst, dissolved in xylene or polydimethylsiloxane oils.

The catalyst is employed in a catalytic amount sufficient to induce and complete the hydrosilylation reaction. Specifically, the amount of catalyst is from 1 to 100 ppm metal catalysts based on the weight of the metal and the total weight of hydridosilyl-containing organic compound of Formula (III) and the alkenyl-oxa-bicyclo[4.1.0]heptane or oxa-bicyclo[4.1.0]heptene. The hydrosilylation reaction may be conducted in a continuous process or a batch process wherein the reactants are introduced into a reactor and the temperature of the mixture adjusted to within the range of from 0° C. to 180° C., and more specifically from 20° C. to 120° C. Upon addition of the catalyst, the reaction is usually exothermic, peaking at a temperature of from 75° C. to 200° C. The reaction can be conducted in an inert atmosphere such as nitrogen.

The hydrosilylation reaction can be optionally conducted in the presence of promoters, as described in U.S. Pat. Nos. 4,847,398; 4,857,583; 5,191,103; or 5,159,096, relevant portions of which are incorporated herein by reference. These promoters include salts of carboxylic acids having Formula (VII):

$$RCO_2M \qquad (VII)$$

wherein:

M is hydrogen, alkali or alkaline earth metals, ammonium or phosphonium salts; and R represents a hydrogen or monovalent hydrocarbon group of from 1 to 20 carbon atoms.

Examples of suitable carboxylic acids include, but are not limited to, monocarboxylic acids containing from 3 to 20 carbon atoms. The carboxylic acid derived promoter are used at amounts of at least 200 ppm, more specifically from 200 ppm to 10,000 ppm, based upon the sum of the weight of the 1,1,1,2,3,3-heptamethyl-trisiloxane and the ethenyl-oxa-bicyclo[4.1.0]heptane.

Other promoters include hindered amines, hindered phosphines, ketone-containing compounds, hydroxyl-containing compounds, and hydroxyl-substituted organic compounds. Representative and non-limiting examples of promoters include salts of carboxylic acid, such as sodium acetate, sodium propanoate, sodium octanoate, tetramethyl ammonium propanoate; hindered amine promoters, such as 2,2,6,6-tetramethyl-4-piperidinol, 2,2,6,6-tetramethylpiperidine, 1,2,2,6,6-pentamethyl-4-piperidinol, 1,2,2,6,6-pentamethylpiperidine, benzyldiisopropylamine, di-t-butylamine, dicyclohexylamine, N,N,N',N'-tetraisopropylethylenediamine, N-isopropylpiperidine, 2,2,6,6-tetramethyl-4(2-hydroxyethoxy)-, piperidine, and 2,2,6,6-tetramethyl-4-piperidone, and hindered phosphine promoters, such as tri-tert-butylphosphine, benzyldiisopropylphosphine, ethyl di-tert-butylphosphine, and di-tert-butylpentylphosphine.

The hydrosilylation reaction of hydridosilyl-containing organic compound of Formula (V) with the ethenyl-oxabicyclo[4.1.0]heptane or oxa-bicyclo[4.1.0]heptene can be carried out with or without solvents. Typical solvents include hydrocarbons, such as toluene, xylenes, hexanes, heptanes, cyclohexanes, and the like and ethers such as tetrahydrofuran, diethyl ether, dimethoxyethane, and the like.

The reaction product of the hydrosilylation reaction made in step (a), can be further purified to remove impurities, byproducts and unreacted starting materials. It is understood that the starting alkenyl-oxa-bicyclo[4.1.0]heptane is a mixture of isomers after epoxidation, unless the stereoisomers are separated, as by for example, distillation. For example, the epoxidation of 4-vinylcyclohexene produces a mixture of from 40 to 60 weight percent cis-3-ethenyl-7-oxa-bicyclo [4.1.0]heptane and 40 to 60 weight percent trans-3-ethenyl-7-oxa-bicyclo[4.1.0]heptane, based upon the total weight of the two stereoisomers. It is preferable to separate the stereoisomers prior to the hydrosilylation reaction because the boiling points of the reactant ethenyl-7-oxa-bicyclo[4.1.0] heptane is lower, thereby facilitating the purification and separation process. Alternatively, the stereoisomers of the reaction product of hydridosilyl-containing organic compounds and alkenyl-oxa-bicyclo[4.1.0]heptane can be separated to produce the stereoisomer which promotes addition of the alpha, beta-unsaturated amido-containing acid to the desired position on the cyclohexyl ring.

The alpha, beta-unsaturated amido-containing acids having the Formula (VI) may be prepared by a variety of methods. For example, amino-containing carboxylic acids or amino-containing thiocarboxylic acids can be reacted with alpha, beta-unsaturated carbonyl chlorides or alpha, beta-unsaturated containing anhydrides. Preferably, acid chlorides are used. The reactions may be run in the presence of catalyst and hydrogen chloride acceptors, such as tertiary amines, especially pyridine, and triethyl amine.

Representative and non-limiting examples of the amino-containing acids include amino-acetic acid; 3-amino-propionic acid; 3-amino-2-methyl-propionic acid; 6-aminohexanoic acid; 6-amino-2-ethyl-hexanoic acid; 12-aminodecanoic acid; 16-amino-hexadecanoic acid; aminothiolacetic acid; 3-amino-thiopropionic acid; and 6-aminohexanethioic acid.

Representative and non-limiting alpha-beta unsaturated carbonyl chloride include acryloyl chloride; 2-methyl-acryloyl chloride; but-2-enoyl chloride and 3-chlorocarbonylacrylic acid methyl ester.

Representative and non-limiting alpha, beta-unsaturated amido-containing acids include acryloylamino-acetic acid; (2-methyl-acryloylamino)-acetic acid; 3-(2-methyl-acryloylamino)-propionic acid; 3-[methyl-(2-methyl-acryloyl)-amino]-propionic acid; 3-(carboxymethyl-carbamoyl)-acrylic acid methyl ester, 3-(thiocarboxymethyl-carbamoyl)-acrylic acid methyl ester; acryloylamino-thioacetic acid; and (2-methyl-acryloylamino)-thioacetic acid.

The ring-opening reaction of the reaction product of step (a) may occur in the presence or absence of a catalyst. It is preferred to carry out the reaction in the presence of catalysts which prevent the beta-hydroxyl group that is formed in the addition reaction from further reacting with the oxirane ring of the reaction product of step (a), thereby forming dimers or oligomers. Catalysts for the reaction can be Bronsted acids or bases, Lewis acid or bases. Specifically, alkali metal hydroxides or alkaline earth metal hydroxides, mineral acids, metal salts or metal chelates can be used. In particular, metal salts or chelates of titanium, zinc, tin, bismuth, zirconium, and the like can be used. Preferably, titanium tetraalkoxides are used, where the alkoxy groups are derived from a monoalcohol containing from 1 to 12 carbon atoms. Representative and non-limiting examples of titanium tetraalkoxides include titanium tetramethoxide, titanium tetraethoxide and titanium tetraisoproproxide.

The reaction of step (b) wherein the product of step (a) is reacted with the alpha, beta-unsaturated amido-containing acids or their salts occur at a temperature of from 15° C. to 180° C., at subatmospheric, atmospheric or superatmospheric pressure. Preferably, the reaction is carried out at a temperature of from 60° C. to 120° C. at atmospheric pressure.

In order to prevent polymerization of the activated carbon-carbon double bond of the alpha, beta-unsaturated amido group, the reaction is carried out in the presence of a polymerization inhibitor. The polymerization inhibitors include phenols, hydroquinone, aromatic amines and derivatives of piperidine-N-oxyl radicals. Representative and non-limiting examples of polymerization inhibitors include hydroquinone, hydroquinone monomethyl ether, 2,6-di-tert-butyl-4-methyl phenol, 4-hydroxy-2,2,6,6-tetramethylpiperidine-N-oxyl radical, 2,2,6,6-tetramethylpiperidine-N-oxyl radical, and the like.

Silicone hydrogel films obtained from alpha, beta-unsaturated amido-containing organosilicon compounds of Formula (I) show high oxygen permeability due to the substitution of the alpha, beta-unsaturated amido-containing carbonyloxy or alpha, beta-unsaturated amido-containing carbonylthiolate on a cyclohexyl linking group, relative to the silicon-containing group. Although not to be held to any theory, the trans-1,3-substitution of the cyclohexyl group is believed to introduce more randomness (entropy) into the polymer containing the monomer of the present invention, thereby introducing a large free volume and better oxygen permeability. The hydroxyl functional groups of the compounds of the present invention, along with the hydrophilic monomers allow the silicone hydrogel films to have sufficient amounts of water and small enough regions of silicone containing units to provide for films that do not cause eye irritation, redness and other corneal complications which may result from direct contact of the eye with regions of high silicone content and hence restrict use of the lenses to limited periods of wear.

The alpha, beta-unsaturated amido-containing organosilicon compounds of the present invention having Formula (I) can be used to obtain cured elastomers with desirable physical strength and resistance to tearing after absorption of water. The use of alpha, beta-unsaturated amido-containing organosilicon compounds of Formula (I) in biomedical devices, especially in contact lenses, is further described in the sections below.

The present invention also provides silicone-hydrogel compositions comprising alpha, beta-unsaturated amido-containing organosilicon compounds of Formula (I) and at least one conventional organic monomer (also called co-monomer). The novel copolymers comprise one or more of the alpha, beta-unsaturated amido-containing organosilicon compounds of Formula (I) copolymerized with one or more of an alkyl 2-alkenoate, cycloalkyl 2-alkenoate, vinyl-containing aryl compound, vinyl-containing aralkyl compound and a relatively small amount of a cross-linking monomer. In general, novel copolymers containing from 20 to 80 parts by weight of the alpha, beta-unsaturated amido-containing organosilicon compounds of Formula (I) and from 80 to 20 parts of the 2-alkenoate, vinyl-containing aryl, vinyl-containing aralkyl monomer having a wide spectrum of suitable properties can be prepared. In one embodiment of the invention, the novel copolymers contain 30 to 55 parts by weight of alpha, beta-unsaturated amido-containing organosilicon compounds of Formula (I) copolymerized with 70 to 45 parts by weight of a $C_1$-$C_4$ alkyl methacrylate and/or acrylate, and/or a cyclohexyl methacrylate and/or acrylate, preferably with a small amount of a cross-linking monomer.

Representative and non-limiting co-monomers include methyl methacrylate, ethyl methacrylate, butyl methacrylate, 2-ethylhexyl acrylate, cyclohexyl methacrylate, methyl acrylate, 2-hydroxyethyl methacrylate (HEMA), N-vinylpyrrolidone (NVP), methacrylic acid (MA), and dimethylacrylamide (DMA), styrene (vinyl benzene), alpha-methylstyrene, N-vinyl-caprolactam, N-vinyl-acetamide, N-vinyl-formamide, N-vinyl-isopropylamide, vinyl naphthalene, vinyl pyridine, vinyl alcohol, vinyl containing silicones, 3-[tris(trimethylsiloxy)silyl]propyl methacrylate; methyl-di(trimethylsiloxy)-silyl propyl glycerol methacrylate; 3-(trimethylsilyl)propyl vinyl carbonate; 3-(vinyloxycarbonylthio)propyl-[tris(trimethylsiloxy)silane]; 3-[tris(trimethylsiloxy)silyl]propyl vinyl carbamate; 3-[tris(trimethylsiloxy)silyl]propyl allyl carbamate; 3-[tris(trimethylsiloxy)silyl]propyl vinyl carbonate and mixtures thereof.

The cross-linking agent may be present in an amount of up to 5 weight percent and higher, desirably from 0.1 to 3 weight percent, and preferably up to 2 weight percent, based on the total monomers. The cross-linking agent, including mixtures thereof, can be any of the conventional ethylenically unsaturated compounds containing at least two polymerizable ethylenic bonds. Thus, there can be used alkylene glycol and polyalkylene glycol esters of acrylic acid, methacrylic acid, or crotonic acid and divinylbenzene. Representative and non-limiting examples of crosslinkers include ethylene glycol diacrylate, ethylene glycol dimethacrylate, propylene glycol diacrylate, propylene glycol dimethacrylate, 1,4-butylene glycol dimethacrylate, ethylene glycol dicrotonate, diethylene glycol dimethacrylate, diethylene glycol diacrylate, dipropylene glycol dimethacrylate, dipropylene glycol diacrylate, trimethylene glycol diacrylate, triethylene glycol dimethacrylate, triethylene glycol dicrotonate, tetraethylene glycol dimethacrylate, hexaethylene glycol dimethacrylate, tripropylene glycol diacrylate, tripropylene glycol dimethacrylate, tetrapropylene glycol dimethacrylate, tributylene glycol dimethacrylate, tetrabutylene glycol dimethacrylate, hexamethylene glycol dimethacrylate, octamethylene glycol dimethacrylate, and decamethylene glycol dimethacrylate. Other suitable cross-linking agents include allyl methacrylate, divinylbenzene, diallyl phthalate, trimethylolpropane trimethacrylate, diallyl tartrate, diallyl maleate, triallylmelamine, N,N'-methylenebisacrylamide, divinyl citraconate, diallyl fumarate, divinyl sulfone, triallyl phosphite, diallyl benzenephosphonate, hexahydro-1,3,5-triacryltriazine, divinyl ether, and triallyl citrate. Also useful as cross-linking agents are the polysiloxanyl-containing polyethylenically unsaturated compounds such as polysiloxanylbis(alkylglycerol acrylate) and polysiloxanylbis(alkylglycerol methacrylate).

The alpha, beta-unsaturated amido-containing organosilicon compounds of the present invention having Formula (I) are desirably miscible with hydrophilic co-monomers without the need for any homogenizing solvent, thereby affording silicone hydrogels that are transparent across the entire range of monomer-co-monomer compositions.

The high oxygen permeability of the novel copolymers is mainly due to its siloxane content. The oxygen permeability of the hydrogel films can be extended up to 170 Dk units when silicone monomers described in the current invention is used along with siloxane and polysiloxane analogues known in the art. However, the greater the number of siloxane bonds in the novel copolymer, the greater the tendency of an undesirable water-repellent characteristic developing in the polymer. In such an eventuality it may be desirable to include in the polymerization mixture hydrophilic monomer such as the 2-hydroethyl methacrylate, 2-hydroethyl acrylate, N-vinylpyrrolidone, N,N-dimethylacrylamide along with other co-monomers.

In another embodiment of the present invention, the polymers can be formed into silicone-hydrogel films, via processes known in the art. The silicone-hydrogel films of the present invention are soft, flexible and highly transparent. Silicone-hydrogel films made from the inventive monomers exhibit better surface wettability and sufficiently oxygen permeable compared to ones made using monomers having linear alkyl linked methacrylated silicone polyether chains. The present silicone hydrogel films were found to have dynamic advancing contact angles with water, in the range of 100° to 25°, which can vary depending on the molecular weight of the polyethers or siloxanes. The contact angle can also be altered in the defined range by adding wetting agents like poly(vinyl pyrrolidone), poly(vinyl alcohol), and hydroxyalkyl cellulose etc.

Polymerization can be carried out under conventional conditions. Thus, for example, polymerization can be carried out specifically at 20° C. to 80° C. and more specifically at 25° to 45° C. The polymerization can be carried out employing a catalytically significant quantity of a free radical catalyst ranging in concentration from 0.05 to 1 percent based on the total weight of polymerizable monomers. Representative and non-limiting free radical catalysts include t-butyl peroctoate, benzoyl peroxide, isopropyl percarbonate, 2,4-dichlorobenzoyl peroxide, methyl ethyl ketone peroxide, cumene hydroperoxide, and dicumyl peroxide. Additional free radical polymerization initiators that can be used include, but are not limited to, bis-(tert-butylcyclohexyl)-peroxydicarbonate, azobisisobutyronitrile, and azobisdimethylvaleronitrile. Irradiation by ultraviolet light, gamma rays, and high-energy radiation, such as with cobalt 60 radiation can be used to polymerize the monomers.

The copolymers of the present invention are clear (no haze from poor miscibility) polymers that absorb 10 weight percent to 60 weight percent of water, showing excellent surface wettability and effective oxygen permeability, all of which are necessary for the better comfort when lens are worn and for good health of the human cornea. The present invention also provides contact lenses made from the silicone-hydrogel films of the claimed invention. The contact lenses produced from the silicone-hydrogel films of the present invention do not require any expensive secondary treatments, like plasma oxidation or plasma coating, or internal wetting agents to improve wettability. That is, the contact lenses produced from silicone-hydrogel films of the present invention, without secondary treatment, are soft, flexible, and inherently wettable and exhibit high oxygen permeability.

The present invention is also directed to copolymers formed by the reaction alpha, beta-unsaturated amido-containing organosilicon compounds of Formula (I) with other activated carbon-carbon double bond containing monomers and crosslinkers. These copolymers are made from one or more alpha, beta-unsaturated amido-containing organosilicon compounds of Formula (I) and at least one other hydrophilic unsaturated organic monomer suitable for use in silicone hydrogels. These hydrophilic unsaturated organic monomers include the representative and non-limiting examples N,N-dimethylacrylamide, 2-hydroxy-ethyl-methacrylate (HEMA), N-vinylpyrrolidone, and methacrylic acid. In such copolymers, the copolymer ratio of the alpha, beta-unsaturated amido-containing organosilicon compounds of Formula (I) to the other activated carbon-carbon double bond containing monomers is from 1:100 to 100:1, preferably from 1:20 to 20:1 and more preferably from 1:2 to 2:1.

In one particular embodiment, a copolymer is prepared from 40 to 60 weight percent of alpha, beta-unsaturated amido-containing organosilicon compounds of Formula (I), 20 to 30 weight percent of dimethylacrylamide, 15 to 25 weight percent 2-hydroxyethyl (meth)acrylate, 1 to 10 weight percent N-vinyl pyrroline and 0.1 to 3 weight percent of ethylene glycol dimethyl acrylate, based on the total weight of alpha, beta-unsaturated amido-containing organosilicon compounds of Formula (I), dimethylacrylamide, 2-hydroxyethyl (meth)acrylate, N-vinyl pyrroline and ethylene glycol dimethyl acrylate.

To form copolymers using the monomers of the present invention, the desired monomers are mixed and the resulting mixture is polymerized and cured to form transparent thin films by known thermal or UV cure techniques, using either peroxides or photoinitiators in the presence of crosslinking agents. The hydrogels films are cured within 20 seconds of UV irradiation when hydroxymethyl propiophenone and biacyl phosphine oxide are used as photoinitiators and the UV radiation has a wavelength of 365 nm. The monomers added to the monomer mix to create the mixture prior to polymerization to form the copolymers may be monomers or prepolymers. A "prepolymer" is a reaction intermediate polymer of medium molecular weight having polymerizable groups.

The copolymers of the present invention form a clear, transparent homogeneous single-phase solution that can be cured directly without employing any additional homogenizing solvents. The alpha, beta-unsaturated amido-containing organosilicon compounds of Formula (I) are miscible with hydrophilic hydrogel monomers. Calculated solubility parameter values based on Fedors method (Robert F. Fedors, Polymer Engineering and Science, February 1974, vol. 14, No. 2) for the present inventive monomers range from approximately 16.5 to approximately 19 $(J/mol)^{1/2}$, which is closer to the solubility parameter value of conventional hydrogel monomers (such as HEMA, NVP and DMA) than silicone monomers such as TRIS. Miscibility is realized if the difference in solubility parameter between the instant inventive monomers and the hydrophilic co-monomers is less than about 7.3 $(J/mol)^{1/2}$.

In another embodiment of the present invention, the polymers may be formed into silicone-hydrogel films, by processes known in the art. The silicone-hydrogel films of the present invention are soft, flexible and highly transparent. The present silicone hydrogel films are found to have dynamic advancing contact angles with water, in the range of 80° to 30° and absorb about 10 to 60 wt. % of water, which can vary depending the other hydrophilic unsaturated organic monomer used in preparing the silicone-hydrogel films. The silicone hydrogels produced are also found to have good mechanical properties (such as low modulus and high tear strength) required for the contact lens application.

Conventional silicone-hydrogel films are generally produced by curing a mixture of hydrophobic silicone monomers and hydrophilic hydrogel monomers in the presence of about 10 to 40 wt. % of solvent, as they are incompatible with each other. However, in the current invention, the alpha, beta-unsaturated amido-containing organosilicon compounds of Formula (I) are generally miscible with conventional hydrophilic hydrogel monomers (such as HEMA, NVP and DMA) and can form a homogeneous solution suitable to produce silicone-hydrogel films without employing any solvent. More specifically, 100% siloxane monomer alone of the invention can be used to make stable hydrogel films using appropriate molds, which is not possible with the linear alkyl linked trisiloxane polyether methacrylates In the present invention, the resulting polymer compositions may be formed into silicone-hydrogel films, via processes known in the art. Accordingly, the present invention is also directed to contact lens produced from either homo or copolymers of the present invention. The monomers/polymers of the present invention can be formed into contact lenses by spincasting processes, as disclosed in U.S. Pat. Nos. 3,408,429 and 3,496,254, cast molding processes, as disclosed in U.S. Pat. Nos. 4,084,459 and 4,197,266, combinations of methods thereof, or any other known method for making contact lenses.

Polymerization may be conducted either in a spinning mold, or a stationary mold corresponding to a desired contact lens shape. The lens may be further subjected to mechanical finishing, as occasion demands. Polymerization may also be conducted in an appropriate mold or vessel to form buttons, plates or rods, which may then be processed (e.g., cut or polished via lathe or laser) to give a contact lens having a desired shape.

The relative softness or hardness of the contact lenses fabricated from the resulting polymer of this invention can be varied. Generally, as the ratio of alpha, beta-unsaturated amido-containing organosilicon compounds of Formula (I) increases relative to the other monomers used in preparing the polymer, the softness of the material increases.

The copolymers of this invention may also contain ultraviolet absorbents, pigments and colorants in the form of additives or co-monomers.

The silicone-hydrogels of the present invention exhibit high oxygen transport with surface wettable properties. The monomers and prepolymers employed in accordance with this invention are readily polymerized to form three-dimensional networks, which permit the transport of oxygen with improved wettability along with desirable mechanicals and optical clarity.

Specific use of the films include intraocular contact lenses, artificial corneas, and soft disposable long-wear contact lenses or as coatings for biomedical devices.

In one aspect the present invention, the polymer can be homopolymer or copolymers. The homopolymers and copolymers can be prepared as an emulsion, waterborne dispersion, solution, latex particles or 100% active compositions.

Emulsions can be prepared through free radical polymerization in the presence of water and emulsifiers. These homopolymers, copolymers, waterborne dispersions, solution, emulsions and latex particles made from the alpha, beta-unsaturated amido-containing organosilicon compounds of the present invention can be used as ingredients in personal care formulations including skin care, hair care, and nail care, such as lipsticks, mascaras, foundations, lotions, creams, shampoos, conditioners and nail polishes, to improve their ware, tactile properties and ease of application. The homopolymer, copolymer, emulsion, waterborne dispersion, solution and latex particles made from the alpha, beta-unsaturated amido-containing organosilicon compounds of the present invention can be used in textile and fiber treatment applications to impart smooth, soft feel and wettability to both natural and synthetic fibers. Finally the homopolymer, copolymer, emulsion, waterborne dispersion, solution and latex particles can be incorporated into coating formulations for metal, plastic, wood and paper, such as varnishes, latex paints and roofing compositions.

In another embodiment of the present invention, other specific used of alpha, beta-unsaturated amido-containing organosilicon compounds of Formula (I) and copolymers made therefrom are as additives or resin for coatings and adhesives. Coatings containing the additive or copolymer of the present invention may show a number of superior properties, including lower surface energy, slip, soft feel, flow and leveling, water resistance and release properties. These properties are of particular interest in coatings for graphic, textile, plastic, wood, architectural, automotive, metal and pressure sensitive adhesive applications. The monofunctionality of the silicon-containing monomer containing a polymerizable alpha, beta-unsaturated amido group prevents excessive viscosity buildup during polymer synthesis. The coatings containing the novel alpha, beta-unsaturated amido-containing organosilicon compounds of Formula (I) and copolymers made therefrom of the present invention may include powder coatings, conversion coatings, passivation coatings, primers, high solids coating, waterborne coatings, solventborne coatings, e-coatings, hardcoats and the like. The following Examples are illustrative only and should not be construed as limiting the invention. All parts and percentages are by weight and all temperatures are in degrees Celsius unless explicitly stated otherwise.

EXAMPLES

The silicone-hydrogel films produced were evaluated for lens properties using the following methods.

Equilibrium Water Content.

The film was immersed in deionized water for 48 hours. Then the surface water was wiped off gently using lintless tissue paper. The hydrated film was weighed precisely and then dried in an oven at 37° C. for 48 hours and weighed again for dry weight. Water content was calculated based on weight change using the following equation.

$$\% \text{ Water content} = \frac{\left[\begin{array}{c}\text{Weight of hydrated lens} - \\ \text{Weight of dry lens}\end{array}\right] \times 100\%}{\text{Weight of hydrated lens}}$$

Water Wettability.

Water wettability was measured according to: Neumann A W, Godd R J. Techniques of measuring contact angles. In: Good R J, Stromberg R R, Editors. Surface and Colloid science—Experimental methods, vol. 11. New York: Plenum Publishing; (1979), pp. 31-61.

Water wettability of the film surface was evaluated by measuring contact angle using both a dynamic contact angle method and a captive air bubble method with a Rame Hart NRL CA. goniometer. In the dynamic contact angle method the wet films were first pressed with lintless tissue paper and then a drop of water was placed on the surface. The contact angle was measured with respect to time using a goniometer. In the captive bubble method, which better simulates the on eye conditions, an air bubble injected from a syringe is brought into contact with the film immersed in Milli-Q water and the contact angle is then measured. Lower contact angle values represent a greater degree of hydrophilicity or better surface wettability of the film.

Oxygen Permeability (Dk Value).

The oxygen permeability (Dk) for these samples was measured using polarographic technique following ISO 9913 standards method. The film was clamped into the permeation cell and the donor chamber was filled with oxygen saturated PBS (phosphate buffered saline). The concentration of oxygen in the receptor cell was monitored, and plotted as a function of time and the permeability was determined from the initial slope of the plot.

Oxygen permeability, also called the Dk value, which may be expressed in Barrer, wherein 1 Barrer=$10^{-11}$ ($cm^3$ $O_2$) cm $cm^{-2}$ $s^{-1}$ $mmHg^{-1}$, wherein ($cm^3$ $O_2$) is at a quantity of oxygen at standard temperature and pressure and wherein cm represents the thickness of the material and $cm^{-2}$ is the reciprocal of the surface area of that material or $3.348 \times 10^{-19}$ kmol m/($m^2$ s Pa). The Dk of water is 80 Barrer.

Modulus.

The Young's modulus of the hydrated film was measured using an Instron tensile tester. The wet samples were cut into 6 cm×0.8 cm strips and the mechanical properties were measured with a load cell of 50 N and crosshead speed of 10 mm/minute. The modulus was determined from the initial slope of a stress-strain curve. Modulus is directly correlated to the softness of the material. Lower the modulus, softer the material.

Refractive Index.

The refractive index was measured in accordance with ASTM D1218, Standard Test Method for Refractive Index and Refractive Dispersions of Hydrocarbon Liquids, at 20° C.

Density.

The density was measured in accordance with ASTM D891-09, Method for Specific Gravity, Apparent, of Liquid Industrial Chemicals, at 20° C.

Example 1

Preparation of (2-methyl-acryloylamino)-acetic acid 2-hydroxy-5-[2-bis-(trimethylsiloxy)methylsilanylethyl]-cyclohexyl ester using a titanium alkoxide catalyst for the epoxy ring opening reaction Step (a)

Into a 500 mL round bottom flask equipped with a temperature controller, heating mantel, and condenser 3-ethenyl-7-oxabicyclo[4.1.0]heptane (57.8 grams, 0.47 moles) was added. The solution was stirred with a magnetic stirrer and heated to 75° C. Chloroplatinic acid (20 ppm) was added followed by the slow addition of 1,1,1,3,5,5,5-heptmethyltrisiloxane (100 g, 0.45 moles) via an addition funnel. The exotherm was not allowed to go above 85° C. After the addition the reaction was held at 75° C. for 2 hours. The resulting product was distilled through a 6 inch Vigreux column under a 0.9 torr vacuum. The product, 3-[bis-(trimethylsiloxy)methylsilanyl-ethyl]-7-oxabicyclo[4.1.0] heptane, evolved between 110 and 120° C. The pure product (151.1 grams, 96% yield) was a clear colorless fluid.

Step (b)

3-[Bis-(trimethylsiloxy)methylsilanyl-ethyl]-7-oxabicyclo[4.1.0]heptane (100 grams, 0.288 moles), 2,2,6,6-tetramethylpiperidine-N-oxyl (0.0034 gram), and titanium tetraethoxide (0.44 gram) was charged into a 3-necked round bottom flask equipped with a magnetic stirrer. (2-Methyl-acryloylamino)-acetic acid (41.3 grams, 0.288 moles) was dissolved in methyl ethyl ketone and added slowly to the flask, heated to 110° C. and stirred at atmospheric pressure for 24 hours. The product was cooled to room temperature. Titanium dioxide solids formed. The reaction mixture was filtered using a Buckner funnel through a bed of Celite (2 centimeter thick). The Celite was washed twice with methyl ethyl ketone (10 mL) and the filtrates were added together. The filtrates were treated with activated carbon to decolorize the product, filtered and concentrated under reduced pressure. The final product, (2-methyl-acryloylamino)-acetic acid 2-hydroxy-5-[2-bis-(trimethylsiloxy)methylsilanyl-ethyl]-cyclohexyl ester, was obtained as pale brown colored oil. The NMR analyses are:

$^1$H-NMR (300 MHz, CDCl$_3$): 0.04-0.1 (m, 23H); 0.39-0.45 (m, 2H); 1.2-1.8 (m, 9H); 1.97 (s, 3H); 2.5-2.8 (br. S, 1H); 3.8-3.65 (m, 1H); 4.07 (m, 2H); 4.7-4.9 (m, 1H); 5.4 (s, 1H); 5.8 (s, 1H); 6.5 (br. S, 1H)

$^{29}$Si-NMR (MHz, CDCl$_3$): 7.15 (s, 2Si); −21.2 (s, 1Si)

(2-Methyl-acryloylamino)-acetic acid was prepared in a separate step Amino-acetic acid (25 grams, 0.33 moles) was added in small increments to 250 mL round bottomed flask containing sodium hydroxide (34 grams, 0.83 moles) dissolved in 100 mL dionized water. The flask was cooled to less than 5° C. using ice-salt bath. 2-Methyl-acryloyl chloride (40.8 grams, 0.39 moles) was added dropwise over a period of 30 to 45 minutes, while maintaining the bath temperature below 5° C. After the addition of the 2-methyl-acryloyl chloride was completed, the reaction mixture was allowed to warm to room temperature, acidified to pH 3 and extracted 4 times with ethyl acetate (40 mL). The ethyl acetate layer was separated using a separating funnel and transferred to a conical flask containing anhydrous sodium sulfate (50 g). The ethyl acetate was decanted to a round bottom flask and the solvent was removed under reduced pressure to obtain (2-methyl-acryloylamino)-acetic acid as a white solid powder.

Example 2

Preparation of Hydrogel Using Compound of Example 1, Dimethylacrylamide, 2-Hydroxyethyl Methacrylate, and N-Vinyl Pyrollidone Co-Monomers The compound obtained in Example 1 (50 grams), dimethylacrylamide (25 grams) 2-hydroxyethylmethacrylate (20 grams), N-vinyl pyrollidone (5 grams), ethylene glycol dimethacrylate (EGDMA, 0.5 gram), and benzoyl peroxide (0.5 gram) were mixed and stirred. The resulting clear, homogeneous and transparent reaction mixture was purged with nitrogen gas and poured into a steel mold and cured at 85° C. to 90° C. for 4 hours in a hot air oven. The film thickness was between 1 to 2 millimeters. After curing, the film was released from the mold by submerging it in boiling water. The leachable monomers were removed using isopropanol-water wash. The film was then stored in deionized water. The silicone hydrogel film produced was transparent, soft and flexible and had the properties:

Percent water content: 25±2%
Captive bubble contact angle: 30±2 degrees
% Transmittance: greater than 95% (1 mm thickness)
Modulus: 0.4±0.1 MPa Example 3

Preparation of (2-methyl-acryloylamino)-acetic acid 2-hydroxy-5-[2-tris-(trimethylsiloxy)silanyl-ethyl]-cyclohexyl ester using a titanium alkoxide catalyst for the epoxy ring opening reaction Step (a)

Into a 500 mL round bottom flask equipped with a temperature controller, heating mantel, and condenser 3-ethenyl-7-oxabicyclo[4.1.0]heptane (57.8 grams, 0.47 moles) is added. The solution is stirred with a magnetic stirrer and heated to 75° C. Chloroplatinic acid (20 ppm) is added and is followed by the slow addition of tris-(trimethylsiloxy)hydridosilane (133 grams, 0.45 moles) via an addition funnel. The exotherm is not allowed to go above 85° C. After the addition the reaction is held at 75° C. for 2 hours. The resulting product is distilled through a 6 inch Vigreux column under a 0.9 torr vacuum. The product is 3-[tris-(trimethylsiloxy)silanyl-ethyl]-7-oxabicyclo[4.1.0]heptane.

Step (b)

3-[tris-(trimethylsiloxy)silanyl-ethyl]-7-oxabicyclo [4.1.0]heptane (121 grams, 0.288 moles), 2,2,6,6-tetramethylpiperidine-N-oxyl (0.0034 gram), and titanium tetraethoxide (0.44 gram) is charged into a 3-necked round bottom flask equipped with a magnetic stirrer. (2-Methyl-acryloylamino)-acetic acid (41.3 grams, 0.288 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is (2-methyl-acryloylamino)-acetic acid 2-hydroxy-5-[2-tris-(trimethylsiloxy)silanyl-ethyl]-cyclohexyl ester.

(2-Methyl-acryloylamino)-acetic acid is prepared in a separate step using the procedure of Example 1.

Example 4

Preparation of (2-methyl-acryloylamino)-acetic acid 2-hydroxy-5-{2-[2-(trimethylsilanyl-ethyl)dimethylsilanyl]-ethyl}-cyclohexyl ester using a titanium alkoxide catalyst for the epoxy ring opening reaction Step (a)

Into a 500 mL round bottom flask equipped with a temperature controller, heating mantel, and condenser 3-ethenyl-7-oxabicyclo[4.1.0]heptane (57.8 grams, 0.47 moles) is added. The solution is stirred with a magnetic stirrer and heated to 75° C. Chloroplatinic acid (20 ppm) is added and is followed by the slow addition of 1-dimethyl-silanyl-2-trimethylsilanyl-ethane (72 grams, 0.45 moles) via an addition funnel. The exotherm is not allowed to go above 85° C. After the addition the reaction is held at 75° C. for 2 hours. The resulting product is distilled through a 6 inch Vigreux column under a 0.9 torr vacuum. The product is 3-{2-[2-(trimethylsilanyl-ethyl)dimethylsilanyl]-ethyl}-7-oxabicyclo[4.1.0]heptane.

Step (b)

3-{2-[2-(trimethylsilanyl-ethyl)dimethylsilanyl]-ethyl}-7-oxabicyclo[4.1.0]heptane (81.8 grams, 0.288 moles), 2,2,6,6-tetramethylpiperidine-N-oxyl (0.0034 gram), and titanium tetraethoxide (0.44 gram) is charged into a 3-necked round bottom flask equipped with a magnetic stirrer. (2-Methyl-acryloylamino)-acetic acid (41.3 grams, 0.288 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is (2-methyl-acryloylamino)-acetic acid 2-hydroxy-5-{2-[2-(trimethylsilanyl-ethyl)dimethylsilanyl]-ethyl}-cyclohexyl ester.

(2-Methyl-acryloylamino)-acetic acid is prepared in a separate step using the procedure of Example 1.

Example 5

Preparation of (2-methylacryloylamino)-acetic acid 2-hydroxy-5-{2-[1,1,3,3-tetramethyl-3-(2-trimethyl-silanyl-ethyl)-disiloxanyl]-ethyl}cyclohexyl ester using a titanium alkoxide catalyst for the epoxy ring opening reaction Step (a)

Into a 500 mL round bottom flask equipped with a temperature controller, heating mantel, and condenser 3-ethenyl-7-oxabicyclo[4.1.0]heptane (57.8 grams, 0.47 moles) is added. The solution is stirred with a magnetic stirrer and heated to 75° C. Chloroplatinic acid (20 ppm) is added and is followed by the slow addition of 1,1,3,3-tetramethyl-1-(2-trimethylsilanyl-ethyl)-disiloxane (105 grams, 0.45 moles) via an addition funnel. The exotherm is not allowed to go above 85° C. After the addition the reaction is held at 75° C. for 2 hours. The resulting product is distilled through a 6 inch Vigreux column under a 0.9 torr vacuum. The product is 3-{2-[1,1,3,3-tetramethyl-3-(2-trimethylsilanyl-ethyl)-disiloxanyl]-ethyl}-7-oxabicyclo[4.1.0]heptane.

Step (b)

3-[tris-(trimethylsiloxy)silanyl-ethyl]-7-oxabicyclo[4.1.0]heptane (102.6 grams, 0.288 moles), 2,2,6,6-tetramethylpiperidine-N-oxyl (0.0034 gram), and titanium tetraethoxide (0.44 gram) is charged into a 3-necked round bottom flask equipped with a magnetic stirrer. (2-Methyl-acryloylamino)-acetic acid (41.3 grams, 0.288 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is (2-methylacryloylamino)-acetic acid 2-hydroxy-5-{2-[1,1,3,3-tetramethyl-3-(2-trimethylsilanyl-ethyl)-disiloxanyl]-ethyl}cyclohexyl ester.

(2-Methyl-acryloylamino)-acetic acid is prepared in a separate step using the procedure of Example 1.

Example 6

Preparation of (2-methyl-acryloylamino-acetic acid 2-hydroxy-5-[2-(2,4,4,6,6-pentamethyl-[1,3,5,2,4,6] trioxatrisilinan-2-yl)-ethyl]-cyclohexyl ester using a titanium alkoxide catalyst for the epoxy ring opening reaction Step (a)

Into a 500 mL round bottom flask equipped with a temperature controller, heating mantel, and condenser 3-ethenyl-7-oxabicyclo[4.1.0]heptane (57.8 grams, 0.47 moles) is added. The solution is stirred with a magnetic stirrer and heated to 75° C. Chloroplatinic acid (20 ppm) is added and is followed by the slow addition of tris-(trimethylsiloxy)hydridosilane (93.6 grams, 0.45 moles) via an addition funnel. The exotherm is not allowed to go above 85° C. After the addition the reaction is held at 75° C. for 2 hours. The resulting product is distilled through a 6 inch Vigreux column under a 0.9 torr vacuum. The product is 3-[2-(2,4,4,6,6-pentamethyl-[1,3,5,2,4,6]trioxatrisilinan-2-yl)-ethyl]-7-oxabicyclo[4.1.0]heptane.

Step (b)

3-[2-(2,4,4,6,6-pentamethyl-[1,3,5,2,4,6]trioxatrisilinan-2-yl)-ethyl]-7-oxabicyclo[4.1.0]heptane (95.3 grams, 0.288 moles), 2,2,6,6-tetramethylpiperidine-N-oxyl (0.0034 gram), and titanium tetraethoxide (0.44 gram) is charged into a 3-necked round bottom flask equipped with a magnetic stirrer. (2-Methyl-acryloylamino)-acetic acid (41.3 grams, 0.288 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is (2-methyl-acryloylamino-acetic acid 2-hydroxy-5-[2-(2,4,4,6,6-pentamethyl-[1,3,5,2,4,6]trioxatrisilinan-2-yl)-ethyl]-cyclohexyl ester.

(2-Methyl-acryloylamino)-acetic acid is prepared in a separate step using the procedure of Example 1.

Example 7

Preparation of (2-acryloylamido-glycolic acid, 2-hydroxy-5-[2-(2,4,4,6,6-pentamethyl-[1,3,5,2,4,6] trioxatrisilinan-2-yl)-ethyl]-cyclohexyl ester using magnesium triflate catalyst for the epoxy ring opening reaction Step (a) Synthesis of 2-Acrylamidoglycolic Acid 2-Acryamidoglycolic acid was first prepared and then used for the ring-opening reaction. The synthesis was performed, according to equation below, as described in Example 1 of U.S. Pat. No. 4,810,822.

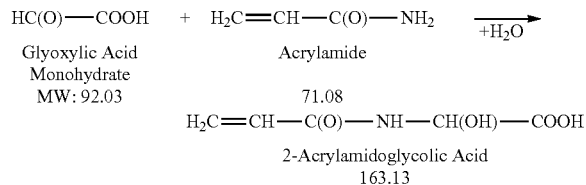

A 4-neck round bottom flask was fitted with a heating mantle, heater controller, thermocouple, reflux condenser, funnel and mechanical stirrer. A nitrogen purge line was affixed to the top of the condenser. An aqueous solution of glyoxylic acid was prepared in the flask by dissolving 50 g (0.54 moles) of the monohydrate in 50 ml mechanically stirred deionized water. The temperature of the water decreased from 22° C. to 19° C. during the dissolution. 4-Methoxyphenol (0.1 g), 50 g ethylacetate and 38.4 g acrylamide (0.54 moles) were then added in that order to the stirred solution in the flask. The temperature decreased to 11.8° C. as the acrylamide dissolved. On completion of the acrylamide addition, the funnel was replaced with a stopper and the reaction mixture warmed to 50-55° C. for 3 hours. The warm mixture was transferred to a large beaker and left covered to cool to room temperature. Crystallization of 2-acrylamidoglycolic acid occurs spontaneously at about 27° C. The beaker was left in an ice bath overnight, during which time more solid had formed. The solid was filtered, washed with chilled ethyl acetate and dried with slow flow of nitrogen flow in the hood. 85.6 g solid was recovered.

Step (b)

Reaction of 2-Acrylamidoglycolic Acid with 3-[tris-(trimethylsiloxy)-silanyl-ethyl]-7-oxabicyclo[4.1.0]heptane using Mg(CF$_3$SO$_3$)$_2$ as a catalyst.

A 4-neck round bottom flask was fitted with a heating mantle, heater controller, thermocouple, reflux condenser, addition funnel and mechanical stirrer. A nitrogen purge line was affixed to the top of the condenser. The flask was charged with 35 g (0.1 moles) 3-[tris-(trimethylsiloxy)-silanyl-ethyl]-7-oxabicyclo[4.1.0]heptane, 50 g toluene and 0.15 g Mg(CF$_3$SO$_3$)$_2$ and the stirred contents were warmed to 50° C. Next, a solution of 20 g 2-acrylamidoglycolic acid in 100 g acetone was added over 40 minutes while maintaining the temperature at 50-55° C. The temperature was then raised to 60° C. and stirring continued for 7 hours. 36.1 g product was recovered after the solvents (toluene and acetone) were removed by rotary evaporation in vacuo.

The absence of resonances 51-53 ppm and the presence of resonances at 67-75 ppm and 82.5 ppm in the $^{13}$C NMR showed that the epoxy ring had been opened to form the desired cyclohexyl ester.

Example 8

Preparation of 4-(2-(2,4,4,6,6,8,8-heptamethyl-1,3,5,7,2,4,6,8-tetraoxatetrasilocan-2-yl)ethyl)-2-hydroxycyclohexyl 2-methacrylamidoacetate using a titanium alkoxide catalyst for the epoxy ring opening reaction Step (a)

Into a 500 mL round bottom flask equipped with a temperature controller, heating mantel, and condenser 3-ethenyl-7-oxabicyclo[4.1.0]heptane (22.03 grams, 0.18 moles) is added. The solution is stirred with a magnetic stirrer and heated to 75° C. Chloroplatinic acid (20 ppm) is added and is followed by the slow addition of 2,2,4,4,6,6,8-heptamethyl-1,3,5,7,2,4,6,8-tetraoxatetrasilocane (50 grams, 0.18 moles) via an addition funnel. The exotherm is not allowed to go above 85° C. After the addition the reaction is held at 75° C. for 2 hours. The resulting product is distilled through a 6 inch Vigreux column under a 0.9 torr vacuum. The product is 2-(2-(7-oxabicyclo[4.1.0]heptan-3-yl)ethyl)-2,4,4,6,6,8,8-heptamethyl-1,3,5,7,2,4,6,8-tetraoxatetrasilocane.

Step (b)

2-(2-(7-oxabicyclo[4.1.0]heptan-3-yl)ethyl)-2,4,4,6,6,8,8-heptamethyl-1,3,5,7,2,4,6,8-tetraoxatetrasilocane (50 grams, 0.123 moles), 2,2,6,6-tetramethylpiperidine-N-oxyl (0.0011 gram), and titanium tetraethoxide (0.175 gram) is charged into a 3-necked round bottom flask equipped with a magnetic stirrer. (2-Methyl-acryloylamino)-acetic acid (15.87 grams, 0.123 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is 4-(2-(2,4,4,6,6,8,8-heptamethyl-1,3,5,7,2,4,6,8-tetraoxatetrasilocan-2-yl)ethyl)-2-hydroxycyclohexyl 2-methacrylamidoacetate.

(2-Methyl-acryloylamino)-acetic acid is prepared in a separate step using the procedure of Example 1.

$^1$H-NMR (300 MHz, CDCl$_3$): 0.07-0.1 (m, 23H); 0.47-0.5 (m, 2H); 1.0-1.05 (m, 2H); 1.25-1.97 (m, 6H), 1.98 (s, 3H); 2.4-2.5 (m, 1H); 3.6-3.8 (m, 1H); 4.07 (m, 2H); 4.7-4.9 (m, 1H); 5.4 (s, 1H); 5.8 (s, 1H); 6.4 (br. S, 1H)

$^{29}$Si-NMR (MHz, CDCl$_3$): −19.0 (s, 1Si); −19.2 (s, 2Si); −19.9 (s, 1Si)

Example 9

Preparation of hydrogel using compound of Example 8, 3-[Tris(trimethylsilyloxy)silyl]propyl methacrylate, Trisiloxane polyether methacrylate, dimethylacrylamide, 2-hydroxyethyl methacrylate, and N-vinyl pyrollidone co-monomers The compound obtained in Example 8 (30 grams), Trisiloxane polyether methacrylate (10 grams, known in the art U.S. Pat. No. 4,847,398), 3-[Tris(trimethylsilyloxy)silyl] propyl methacrylate (10 grams, commercial), dimethylacrylamide (25 grams) 2-hydroxyethylmethacrylate (20 grams), N-vinyl pyrollidone (5 grams), ethylene glycol dimethacrylate (EGDMA, 0.5 gram), and Irgacure 819 (0.5 gram) were mixed and stirred. The resulting clear, homogeneous and transparent reaction mixture was purged with nitrogen gas and poured into a polyester mold and cured at 85° C. to 90° C. for 4 hours in a hot air oven. The film thickness was between 1 to 2 millimeters. After curing, the film was released from the mold by submerging it in boiling water. The leachable monomers were removed using isopropanol-water wash. The film was then stored in deionized water. The silicone hydrogel film produced was transparent, soft and flexible and had the properties:
Percent water content: 55±2%
Captive bubble contact angle: 33±2 degrees
% Transmittance: greater than 95% (1 mm thickness)

Example 10

Preparation of 4-(2-(3,5,7,9,11,13-hexaisobutyl-15-isopropyl-2,4,6,8,10,12,14,16,17,18,19,20-dodecaoxa-1,3,5,7,9,11,13,15-octasilapentacyclo[9.5.1.1$^{3,9}$.1$^{5,15}$.1$^{7,13}$]icosan-1-yl)ethyl)-2-hydroxycyclohexyl 2-methacrylamidoacetate using a titanium alkoxide catalyst for the epoxy ring opening reaction 1-(2-(7-oxabicyclo[4.1.0]heptan-3-yl)ethyl)-3,5,7,9,11,13-hexaisobutyl-15-isopropyl-2,4,6,8,10,12,14,16,17,18,19,20-dodecaoxa-1,3,5,7,9,11,13,15-octasilapentacyclo [9.5.1.1$^{3,9}$.1$^{5,15}$.1$^{7,13}$]icosane (50 grams, 0.052 moles), 2,2,6,6-tetramethylpiperidine-N-oxyl (0.0045 gram), and titanium tetraethoxide (0.1 gram) is charged into a 3-necked round bottom flask equipped with a magnetic stirrer. (2-Methyl-acryloylamino)-acetic acid (6.7 grams, 0.052 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is 4-(2-(3,5,7,9,11,13-hexaisobutyl-15-isopropyl-2,4,6,8,10,12,14,16,17,18,19,20-dodecaoxa-1,3,5,7,9,11,13,15-oetasilapentacyclo [9.5.1.1$^{3,9}$.1$^{5,15}$.1$^{7,13}$]icosan-1-yl)ethyl)-2-hydroxycyclohexyl 2-methacrylamidoacetate.

(2-Methyl-acryloylamino)-acetic acid is prepared in a separate step using the procedure of Example 1.

$^1$H-NMR (300 MHz, CDCl$_3$): 0.51 (d, J=6 Hz, 16H); 0.87 (d, J=6 Hz, 42H); 1.2-1.85 (m, 16H); 1.97 (s, 3H); 3.6-3.8 (m, 2H); 4.07 (m, 2H); 4.6-4.8 (m, 1H); 5.4 (s, 1H); 5.8 (s, 1H); 6.4 (br. S, 1H)

$^{29}$Si-NMR (79.51 MHz, CDCl$_3$): −67.1 to −67.3 (m, 1Si); −67.7 (s, 3Si); −67.9 (s, 4Si)

Example 11

Preparation of hydrogel using compound of Example 8, Example 10, 3-[Tris(trimethylsilyloxy)silyl]propyl methacrylate, Trisiloxane polyether methacrylate, dimethylacrylamide, 2-hydroxyethyl methacrylate, and N-vinyl pyrollidone co-monomers The compound obtained in Example 10 (5 grams), Example 8 (25 grams), Trisiloxane polyether methacrylate (10 grams, known in the art U.S. Pat. No. 4,847,398), 3-[Tris(trimethylsilyloxy)silyl]propyl methacrylate (10 grams, commercial), dimethylacrylamide (25 grams) 2-hydroxyethylmethacrylate (20 grams), N-vinyl pyrollidone (5 grams), ethylene glycol dimethacrylate (EGDMA, 0.5 gram), and Irgacure 819 (0.5 gram) were mixed and stirred. The resulting clear, homogeneous and transparent reaction mixture was purged with nitrogen gas and poured into a polyester mold and cured at 85° C. to 90° C. for 4 hours in a hot air oven. The film thickness was between 1 to 2 millimeters. After curing, the film was released from the mold by submerging it in boiling water. The leachable monomers were removed using isopropanol-water wash. The film was then stored in deionized water. The silicone hydrogel film produced was transparent, soft and flexible and had the properties:
Percent water content: 50±2%
Captive bubble contact angle: 38±2 degrees
% Transmittance: greater than 94% (1 mm thickness)

Example 12

Preparation of 2-hydroxy-5-propylcyclohexyl 2-methacrylamidoacetate terminated PDMS Step (a)

Into a 500 mL round bottom flask equipped with a temperature controller, heating mantel, and condenser 3-ethenyl-7-oxabicyclo[4.1.0]heptane (7.31 grams, 0.059 moles) was added. The solution was stirred with a magnetic stirrer and heated to 75° C. Chloroplatinic acid (20 ppm) was added followed by the slow addition of hydride terminated-PDMS with average 45 D-units (100 g, 0.029 moles) via an addition funnel. The exotherm was not allowed to go above 85° C. After the addition the reaction was held at 75° C. for 2 hours. The volatiles were removed under vacuum and (2-(7-oxabicyclo[4.1.0]heptan-3-yl)ethyl)-terminated-PDMS was obtained in quantitative yield.

Step (b)

(2-(7-oxabicyclo[4.1.0]heptan-3-yl)ethyl)-terminated-PDMS (100 grams, 0.027 moles), 2,2,6,6-tetramethylpiperidine-N-oxyl (0.0024 gram), and titanium tetraethoxide (0.04 gram) is charged into a 3-necked round bottom flask equipped with a magnetic stirrer. (2-Methyl-acryloylamino)-acetic acid (3.93 grams, 0.027 moles) is dissolved in methyl ethyl ketone and is added slowly to the flask, is heated to 110° C. and is stirred at atmospheric pressure for 24 hours. The product is cooled to room temperature. Titanium dioxide solids form. The reaction mixture is filtered using a Buckner funnel through a bed of Celite (2 centimeter thick). The Celite is washed twice with methyl ethyl ketone (10 mL) and the filtrates are added together. The filtrates are treated with activated carbon to decolorize the product, are filtered and are concentrated under reduced pressure. The final product is 2-hydroxy-5-propylcyclohexyl 2-methacrylamidoacetate terminated PDMS.

While the above description contains many specifics, these specifics should not be construed as limitations on the scope of the invention, but merely as exemplifications of preferred embodiments thereof. Those skilled in the art will envision many other possible variations that are within the scope and spirit of the invention as defined by the claims appended hereto.

What is claimed is:

1. A composition for forming a hydrogel comprising an alpha, beta-unsaturated amido-containing organosilicon compounds having the structure of Formula (I):

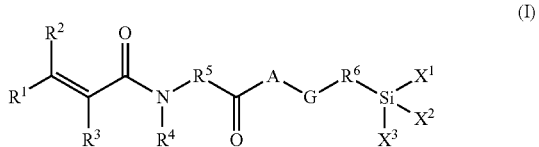

wherein:
- $R^1$, $R^2$, and $R^3$ are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;
- $R^4$ is hydrogen, an alkyl group containing from 1 to 6 carbon atoms, or a phenyl group;
- $R^5$ is an alkylene, containing from 1 to 16 carbon atoms and optionally a heteroatom of oxygen, sulfur, nitrogen, or a combination of two or more thereof;
- A is oxygen or sulfur;
- G is a hydroxyl-substituted cycloalkylene group;
- $R^6$ is a chemical bond or an alkylene group containing from 1 to 16 carbon atoms and optionally a heteroatom of oxygen, sulfur, nitrogen, or a combination of two or more thereof;
- $X^1$ is a methyl, trimethylsiloxy, or $-O[Si(CH_3)_2O-]_n$, wherein n is an integer of from 1 to 9;
- $X^2$ is methyl, trimethylsiloxy or $-[OSi(CH_3)_2]_mG^1$, wherein $G^1$ is $(CH_3)_3SiO-$ or $H(CH_3)_2SiO-$, or an alpha, beta-unsaturated amido-containing group with the general formula:

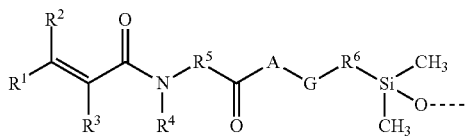

and m is an integer from 0 to 200, with the proviso that when $X^2$ is $-[OSi(CH_3)_2]_mG^1$, then $X^1$ and $X^3$ is methyl;
$X^3$ is methyl, trimethylsiloxy, $(CH_3)_3SiCH_2CH_2-$, $(CH_3)_3SiCH_2CH_2Si(CH_3)_2O-$, or $-OSi(CH_3)_2$, with the provisos that (i) when $X^1$ is $-O[Si(CH_3)_2O-]_n$, then $X^3$ is $-OSi(CH_3)_2$ and $X^1$ forms a chemical bond with the $X^3$ to form a divalent $-X^1-X^3-$ group, which is bonded to the silicon atom to form a cyclic polysiloxane ring, (ii) when $X^3$ is $-OSi(CH_3)_2$, then $X^1$ is $-O[Si(CH_3)_2O-]_n$ and $X^1$ forms a chemical bond with the $X^3$ to form a divalent $-X^1-X^3-$ group, which is bonded to the silicon atom to form a cyclic polysiloxane ring.

2. The composition of claim 1, wherein the alpha, beta unsaturated amido-containing organosilicon compound comprises the structure of Formula (I), wherein $R^1$ and $R^2$ is hydrogen, $R^3$ is hydrogen or methyl, $R^4$ is hydrogen or methyl, A is oxygen, and $R^6$ is independently chosen from a chemical bond, methylene, 1,2-ethylene, 1,3-propylene, 1,2-propylene, 1,3-butylene, and 1,4-butylene.

3. The composition of claim 1, wherein the alpha, beta unsaturated amido-containing organosilicon compound comprises the structure of Formula (I), wherein $R^1$ is $R^7C(=O)OR^8$, wherein $R^7$ is a chemical bond, and $R^8$ is an alkyl group of from 1 to 3 carbon atoms.

4. The composition of claim 1, wherein the alpha, beta unsaturated amido-containing organosilicon compound comprises the structure of Formula (I), wherein $X^1$ is methyl or trimethylsiloxy; $X^2$ is methyl or trimethylsiloxy; and $X^3$ is trimethylsiloxy, dimethyl-(2-trimethylsilanyl-ethyl)-silanyl, or dimethyl-(2-trimethylsilanyl-ethyl)-silanyloxy.

5. The composition of claim 1, wherein the alpha, beta unsaturated amido-containing organosilicon compound comprises the structure of Formula (I), wherein $X^1$ is methyl or trimethylsiloxy; $X^2$ is methyl; and $X^3$ is trimethylsiloxy or dimethyl-(2-trimethylsilanyl-ethyl)-silanyloxy.

6. The composition of claim 1, wherein the alpha, beta-unsaturated amido-containing organosilicon compound is chosen from (acryloylamino)-acetic acid 2-hydroxy-5-[2-bis-(trimethylsiloxy)methylsilanyl-ethyl]-cyclohexyl ester; 3-(acryloylamino)-propionic acid 2-hydroxy-5-[2-bis-(trimethylsiloxy)methylsilanyl-ethyl]-cyclohexyl ester; (2-methyl-acryloylamino)-acetic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 2-methyl-acrylic acid 2-hydroxy-5-bis-(trimethylsiloxy) methylsilanyl-cyclohexyl ester; 9-(3-methoxycarbonyl-acryloylamino)-nonanoic acid 2-hydroxy-5-[3-bis-(trimethylsiloxy)methylsilanyl-propyl]-cyclohexyl ester; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid methyl ester; 3-{2-[2-hydroxy-5-[bis-(3-trimethylsiloxy)methylsilanyl-propyl]-cyclohexyloxycarbonyl]-ethylcarbamoyl}-acrylic acid methyl ester; acryloylamino-acetic acid 2-hydroxy-5-[2-tris-(trimethylsiloxy)silanyl-ethyl]-cyclohexyl ester; 3-(acryloylamino)-propionic acid 2-hydroxy-5-[2-tris-(trimethylsiloxy)silanyl-ethyl]-cyclohexyl ester; (2-methyl-acryloylamino)-acetic acid 2-hydroxy-5-[2-tris-(trimethylsiloxy)silanyl-ethyl]-cyclohexyl ester; 2-methyl-acrylic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(3-methoxycarbonyl-acryloylamino)-nonanoic acid 2-hydroxy-5-[3-tris-(trimethylsiloxy)silanyl-propyl]-cyclohexyl ester; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid methyl ester; 3-{2-[2-hydroxy-5-[3-tris-(trimethylsiloxy)silanyl-propyl]-cyclohexyloxycarbonyl]-ethylcarbamoyl}-acrylic acid methyl ester; acryloylamino-acetic acid 2-hydroxy-5-{2-[1,1,3,3-tetramethyl-3-(2-trimethylsilanyl-ethyl)-disiloxanyl]-ethyl}cyclohexyl ester; (2-methylacryloylamino)-acetic acid 2-hydroxy-5-{2-[1,1,3,3-tetramethyl-3-(2-trimethylsilanyl-ethyl)-disiloxanyl]-ethyl}cyclohexyl ester; acryloylamino-acetic acid 2-hydroxy-5-{2-[dimethyl-(2-trimethylsilanyl-ethyl)-silanyl]-ethyl}-cyclohexyl ester; (2-methylacryloylamino)-acetic acid 2-hydroxy-5-{2-[dimethyl-(2-trimethylsilanyl-ethyl)-silanyl]-ethyl}-cyclohexyl ester; acryloylamino-acetic acid 2-hydroxy-5-[2-(2,4,4,6,6-pentamethyl-[1,3,5,2,4,6]trioxa-trisilinan-2-yl)-ethyl]-cyclohexyl ester; (2-methyl-acryloy-lamino-acetic acid 2-hydroxy-5-[2-(2,4,4,6,6-pentamethyl-[1,3,5,2,4,6]trioxatrisilinan-2-yl)-ethyl]-cyclohexyl ester; acryloylamino-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester, (2-methyl-acryloylamino)-acetic acid 5-[2-(2,4,4,6,6,8,8-heptamethyl-[1,3,5, 7,2, 4,6,8] tetroxatetrasilocan-2-yl)-ethyl]-2-hydroxy-cyclohexyl ester; acryloylamino-acetic acid 4-[dimethyl-(2-trimethylsilanyl-ethyl)-silanyl]-2-hydroxy-cyclohexyl ester, acryloylamino-acetic acid 4-[1,1,3,3-tetramethyl-3-(2-trimethylsilanyl-ethyl)-disiloxanyl]-2-hydroxy-cyclohexyl ester; acryloylamino-acetic acid 4-[2,4,4,6,6,8,8-heptamethyl-[1,3,5,7,2,4,6,8]tetroxatetrasilocan-2-yl]-2-hydroxy-cyclo-hexyl ester; acryloylamino-acetic acid 4-[tris-(trimethylsi-loxy)silanyl]-2-hydroxy-cyclohexyl ester, or a combination of two or more thereof.

7. The composition of claim 1, wherein the alpha, beta unsaturated amido-containing organosilicon compound comprises the structure of Formula (I), wherein G is a cycloalkylene group, and the alpha, beta-unsaturated amido-containing organosilicon compound has the stereochemistry in which the alpha, beta-unsaturated amido group

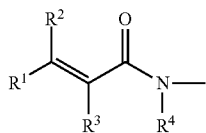

and the silyl group, —R⁶SiX¹X²X³, are substituted in the 1,3-position on the cycloalkylene linking group.

8. The composition of claim 7, wherein the alpha, beta unsaturated amido-containing organosilicon compound comprises the structure of Formula (I), wherein the alpha, beta-unsaturated amido-containing compounds is chosen from acryloylamino-acetic acid 2-hydroxy-5-[bis-(2-trim-ethylsiloxy)methylsilanyl-ethyl]-cyclohexyl ester; (2-methyl-acryloylamino)-acetic acid 2-hydroxy-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid 2-hydroxy-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsi-lanyl-ethyl)-disiloxanyl]-ethyl}-cyclohexyl ester; (2-methyl-acryloylamino)-acetic acid 2-hydroxy-5-{2-[1,1,3,3-tetramethyl-3-(2-trimethylsilanyl-ethyl)-disiloxanyl]-ethyl}-cyclohexyl ester; acryloylamino-acetic acid 2-hydroxy-5-{2-[dimethyl-(2-trimethylsilanyl-ethyl)-silanyl]-ethyl}-cyclohexyl ester; (2-methyl-acryloylamino)-acetic acid 2-hydroxy-5-{2-[dimethyl-(2-trimethylsilanyl-ethyl)-silanyl]-ethyl}-cyclohexyl ester; acryloylamino-acetic acid 5-[2-(2,4,4,6,6,8,8-heptamethyl-[1, 3, 5, 7,2, 4,6,8]tetroxa-tetrasilocan-2-yl)-ethyl]-2-hydroxy-cyclohexyl ester; (2-methyl-acryloylamino)-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester, or a combination of two or more thereof.

9. The composition of claim 1, wherein the alpha, beta unsaturated amido-containing organosilicon compound comprises the structure of Formula (I), wherein the alpha, beta-unsaturated amido-containing organosilicon compound has the stereochemistry in which the alpha, beta-unsaturated amido group and the silyl group is in a trans-1,3-substitution on the cycloalkylene linking group and having the stereo-chemistry of Formula (II):

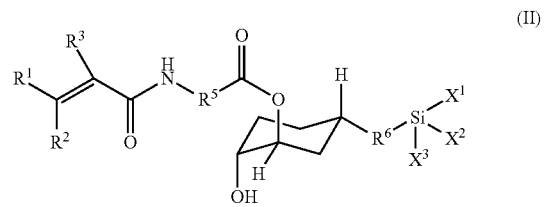

wherein:
R¹, R², and R³ are independently chosen from hydrogen, an alkyl group containing from 1 to 3 carbon atoms, a phenyl group, or R⁷C(=O)OR⁸, wherein R⁷ is a chemical bond or an alkylene group containing from 1 to 6 carbon atoms, and R⁸ is hydrogen or an alkyl group of from 1 to 3 carbon atoms;
R⁴ is hydrogen, an alkyl group containing from 1 to 6 carbon atoms, or a phenyl group;
R⁵ is an alkylene group containing from 1 to 16 carbon atoms and optionally a heteroatom of oxygen, sulfur, nitrogen, or a combination of two or more thereof;
R⁶ is a chemical bond or an alkylene group containing from 1 to 16 carbon atoms and optionally a heteroatom of oxygen, sulfur, nitrogen, or a combination of two or more thereof;
X¹ is a methyl, trimethylsiloxy, or —O[Si(CH₃)₂O—]ₙ, wherein n is an integer of from 1 to 9;
X² is methyl, or trimethylsiloxy;
X³ is methyl, trimethylsiloxy, (CH₃)₃SiCH₂CH₂—, (CH₃)₃SiCH₂CH₂Si(CH₃)₂O—, or —OSi(CH₃)₂, with the provisos that (i) when X¹ is —O[Si(CH₃)₂O—]ₙ, then X³ is —OSi(CH₃)₂ and X¹ forms a chemical bond with the X³ to form a divalent —X¹-X³— group, which is bonded to the silicon atom to form a cyclic polysiloxane ring, (ii) when X³ is —OSi(CH₃)₂, then X¹ is —O[Si(CH₃)₂O—]ₙ and X¹ forms a chemical bond with the X³ to form a divalent —X¹-X³— group, which is bonded to the silicon atom to form a cyclic polysiloxane ring.

10. The composition of claim 1, wherein the alpha, beta unsaturated amido-containing organosilicon compound comprises the structure of Formula (I), wherein alpha, beta-unsaturated amido-containing organosilicon compound also has the general Formula (III):

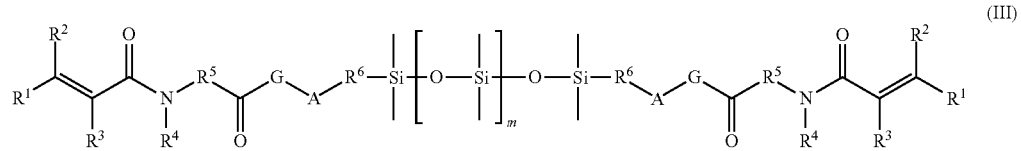

wherein:

$R^1$, $R^2$, or $R^3$ are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms and $R^8$ is hydrogen or an alkyl group of from 1 to 3 carbon atoms;

$R^4$ is hydrogen or an alkyl group containing from 1 to 6 carbon atoms or phenyl;

$R^5$ is an alkylene group containing from 1 to 16 carbon atoms and optionally a heteroatom of oxygen, sulfur, nitrogen, or a combination of two or more thereof;

A is oxygen, nitrogen or sulfur;

G is a hydroxyl-substituted cyclohexylene group;

$R^6$ is a chemical bond or an alkylene group containing from 1 to 16 carbon atoms.

11. The composition of claim 9, wherein the alpha, beta-unsaturated amido-containing organosilicon compound is chosen from acryloylamino-acetic acid trans-2-hydroxy-trans-5-[bis-(2-trimethylsiloxy)methylsilanyl-ethyl]-cyclohexyl ester; (2-methyl-acryloylamino)-acetic acid trans-2-hydroxy-trans-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid trans-2-hydroxy-trans-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsilanyl-ethyl)-disiloxanyl]-ethyl}-cyclohexyl ester; (2-methyl-acryloylamino)-acetic acid trans-2-hydroxy-trans-5-{2-[1,1,3,3-tetramethyl-3-(2-trimethylsilanyl-ethyl)-disiloxanyl]-ethyl}-cyclohexyl ester; acryloylamino-acetic acid trans-2-hydroxy-trans-5-{2-[dimethyl-(2-trimethylsilanyl-ethyl)-silanyl]-ethyl}-cyclohexyl ester; and (2-methyl-acryloylamino)-acetic acid trans-2-hydroxy-trans-5-{2-[μmethyl-(2-trimethylsilanyl-ethyl)-silanyl]-ethyl}-cyclohexyl ester; acryloylamino-acetic acid trans-2-hydroxy-trans-5-[2-(2,4,4,6,6-pentamethyl-[1,3,5,2,4,6]trioxatrisilinan-2-yl)-ethyl]-cyclohexyl ester; or a combination of two or more thereof.

12. The composition of claim 1, wherein, the composition cures to self-standing film in 10 seconds or less using 365 nm light with an intensity of 105 mW/cm$^2$.

13. The composition of claim 1, wherein the alpha, beta unsaturated amido-containing organosilicon compound comprises the structure of Formula (I), comprising:

(a) a reaction of an oxa-bicyclo[4.1.0]heptene or alkenyl-oxa-bicyclo[4.1.0]heptane having the Formula (IV):

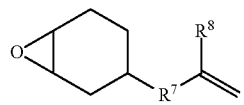

(IV)

with a hydridosilyl-containing organic compound of Formula (V):

$$H-SiX^1X^2X^3 \quad (V)$$

wherein:

$R^7$ is a chemical bond or an alkylene group containing from 1 to 14 carbon atoms an optionally a heteroatom of oxygen, sulfur or nitrogen; and $R^8$ is hydrogen or an alkyl group of from 1 to 6 carbon atoms, $X^1$ is a methyl, trimethylsiloxy, or —O[Si(CH$_3$)$_2$O—]$_n$, wherein n is an integer of from 1 to 9;

$X^2$ is methyl, trimethylsiloxy, or —[OSi(CH$_3$)$_2$]$_m$G$^2$, wherein G$^2$ is (CH$_3$)$_3$SiOSi(CH$_3$)$_2$O— or H(CH$_3$)$_2$SiO—; and m is an integer from 0 to 200, with the proviso that when $X^2$ is —[OSi(CH$_3$)$_2$]$_m$G$^2$, then $X^1$ and $X^3$ is methyl;

$X^3$ is methyl, trimethylsiloxy, (CH$_3$)$_3$SiCH$_2$CH$_2$—, (CH$_3$)$_3$SiCH$_2$CH$_2$Si(CH$_3$)$_2$O— or —OSi(CH$_3$)$_2$, with the provisos that (i) when $X^1$ is —O[Si(CH$_3$)$_2$O—]$_n$, then $X^3$ is —OSi(CH$_3$)$_2$ and $X^1$ forms a chemical bond with the $X^3$ to form a divalent —$X^1$-$X^3$— group, which is bonded to the silicon atom to form a cyclic polysiloxane ring, (ii) when $X^3$ is —OSi(CH$_3$)$_2$, then $X^1$ is —O[Si(CH$_3$)$_2$O—]$_n$ and $X^1$ forms a chemical bond with the $X^3$ to form a divalent —$X^1$-$X^3$— group, which is bonded to the silicon atom to form a cyclic polysiloxane ring, and in the presence of a hydrosilylation catalyst; and (b) a reaction of the product of step (a) with an alpha, beta-unsaturated amido-containing acid having the Formula (VI):

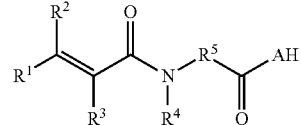

(VI)

wherein:

$R^1$, $R^2$, or $R^3$ are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen, or an alkyl group containing from 1 to 6 carbon atoms, or a phenyl group;

$R^5$ is an alkylene group containing from 1 to 16 carbon atoms and optionally a heteroatom of oxygen, sulfur, nitrogen or a combination of two or more thereof; and A is oxygen or sulfur, the reaction in (b) optionally being carried out in the presence of an addition catalyst, to open the oxirane ring and provide for polymerizable amido-containing organosilicon compounds.

14. The composition of claim 13, wherein the alkenyl-oxa-bicyclo[4.1.0]heptane comprises greater than 85 weight percent of 3-ethenyl-7-oxa-bicyclo[4.1.0]heptane, which has the oxygen atom of the oxirane ring bonded to the 1 and 6-carbon atoms of the cyclohexyl group in the C-1 equatorial and C-6 axial positions and has a vinyl group bonded to the 3-carbon atom of the cyclohexyl ring in the equatorial position, based upon the total weight of the 3-ethenyl-oxa-bicyclo[4.1.0]heptane, or is greater than 85 weight percent 2-ethenyl-7-oxa-bicyclo[4.1.0]heptane, which has the oxygen atom of the oxirane ring bonded to the 1 and 6-carbon atoms of the cyclohexyl group in the C-1 axial and C-6 equatorial positions and has the vinyl group bonded to the 2-carbon atom of the cyclohexyl ring in the equatorial position, based upon the total weight of the ethenyl-oxa-bicyclo[4.1.0]heptane.

15. The composition of claim 13, wherein the hydridosilyl-containing organic compounds are chosen from 1,1,1,2, 3,3,3-heptamethyl-trisiloxane; tris-(trimethylsiloxy)hydridosilane; 1-dimethylsilanyl-2-trimethylsilanyl-ethane; 1,1,3,3-tetramethyl-1-(2-trimethylsilanyl-ethyl)-disiloxane; and 2,2,4,4,6-pentamethyl-[1,3,5,2,4,6]trioxatrisilinane, or a combination of two or more thereof.

16. The composition of claim 13, wherein the hydrosilylation catalyst is chosen from platinum, palladium, ruthenium, iridium and rhodium, metal complexes of platinum, palladium, ruthenium, iridium, rhodium, or a combination of two or more thereof.

17. The composition of claim 13, wherein the hydrosilylation catalyst described in claim 13 is chosen from chloroplatinic acid dissolved in ethanol, chloroplatinic acid dissolved in isopropanol, chloroplatinic acid dissolved in octanol, platinum(0)-1,3-divinyl-1,1,3,3-tetramethyldisiloxane complex dissolved in xylene and platinum(0)-1, 3-divinyl-1,1,3,3-tetramethyldisiloxane complex dissolved in polydimethylsiloxane oils, or a combination of two or more thereof.

18. The composition of claim 13, wherein the alpha-beta unsaturated amido-containing acid is chosen from the acryloylamino-acetic acid; (2-methyl-acryloylamino)-acetic acid; 3-(2-methyl-acryloylamino)-propionic acid; 3-[methyl-(2-methyl-acryloyl)-amino]-propionic acid; 3-(carboxymethyl-carbamoyl)-acrylic acid methyl ester; 3-(thiocarboxymethyl-carbamoyl)-acrylic acid methyl ester; acryloylamino-thioacetic acid; and (2-methyl-acryloylamino)-thioacetic acid; or a combination of two or more thereof.

19. The composition of claim 13, wherein alpha, beta unsaturated amido-containing organosilicon compound is chosen from (acryloylamino)-acetic acid 2-hydroxy-5-[2-bis-(trimethylsiloxy)methylsilanyl-ethyl]-cyclohexyl ester; 3-(acryloylamino)-propionic acid 2-hydroxy-5-[2-bis-(trimethylsiloxy)methylsilanyl-ethyl]-cyclohexyl ester; (2-methyl-acryloylamino)-acetic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 2-methyl-acrylic acid 2-hydroxy-5-bis-(trimethylsiloxy)methylsilanyl-cyclohexyl ester; 9-(3-methoxycarbonyl-acryloylamino)-nonanoic acid 2-hydroxy-5-[3-bis-(trimethylsiloxy)methylsilanyl-propyl]-cyclohexyl ester; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid methyl ester; 3-{2-[2-hydroxy-5-[bis-(3-trimethylsiloxy)methylsilanyl-propyl]-cyclohexyloxycarbonyl]-ethylcarbamoyl}-acrylic acid methyl ester; acryloylamino-acetic acid 2-hydroxy-5-[2-tris-(trimethylsiloxy)silanyl-ethyl]-cyclohexyl ester; 3-(acryloylamino)-propionic acid 2-hydroxy-5-[2-tris-(trimethylsiloxy)silanyl-ethyl]-cyclohexyl ester; (2-methyl-acryloylamino)-acetic acid 2-hydroxy-5-[2-tris-(trimethylsiloxy)silanyl-ethyl]-cyclohexyl ester; 2-methyl-acrylic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(3-methoxycarbonyl-acryloylamino)-nonanoic acid 2-hydroxy-5-[3-tris-(trimethylsiloxy)silanyl-propyl]-cyclohexyl ester; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid methyl ester; 3-{2-[2-hydroxy-5-[3-tris-(trimethylsiloxy)silanyl-propyl]-cyclohexyloxycarbonyl]-ethylcarbamoyl}-acrylic acid methyl ester; acryloylamino-acetic acid 2-hydroxy-5-{2-[1,1,3,3-tetramethyl-3-(2-trimethylsilanyl-ethyl)-disiloxanyl]-ethyl}cyclohexyl ester; (2-methylacryloylamino)-acetic acid 2-hydroxy-5-{2-[1,1,3,3-tetramethyl-3-(2-trimethylsilanyl-ethyl)-disiloxanyl]-ethyl}cyclohexyl ester; acryloylamino-acetic acid 2-hydroxy-5-{2-[dimethyl-(2-trimethylsilanyl-ethyl)-silanyl]-ethyl}-cyclohexyl ester; (2-methylacryloylamino)-acetic acid 2-hydroxy-5-{2-[dimethyl-(2-trimethylsilanyl-ethyl)-silanyl]-ethyl}-cyclohexyl ester; acryloylamino-acetic acid 2-hydroxy-5-[2-(2,4,4, 6, 6-pentamethyl-[1,3,5,2,4, 6]trioxatrisilinan-2-yl)-ethyl]-cyclohexyl ester; (2-methyl-acryloylamino)-acetic acid 2-hydroxy-5-[2-(2,4,4, 6,6-pentamethyl-[1,3,5,2,4,6]trioxatrisilinan-2-yl)-ethyl]-cyclohexyl ester; acryloylamino-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester, (2-methyl-acryloylamino)-acetic acid 5-[2-(2,4,4,6,6,8,8-heptamethyl-[1,3,5, 7,2,4,6,8]tetroxatetrasilocan-2-yl)-ethyl]-2-hydroxy-cyclohexyl ester; acryloylamino-acetic acid 4-[dimethyl-(2-trimethylsilanyl-ethyl)-silanyl]-2-hydroxy-cyclohexyl ester, acryloylamino-acetic acid 4-[1,1,3,3-tetramethyl-3-(2-trimethylsilanyl-ethyl)-disiloxanyl]-2-hydroxy-cyclohexyl ester; acryloylamino-acetic acid 4-[2,4,4,6,6,8,8-heptamethyl-[1,3,5,7,2,4,6,8]tetroxatetrasilocan-2-yl]-2-hydroxy-cyclohexyl ester; and acryloylamino-acetic acid 4-[tris-(trimethylsiloxy)silanyl]-2-hydroxy-cyclohexyl ester, or a combination of two or more thereof.

20. The composition of claim 13, wherein the alpha, beta-unsaturated amido-containing organosilicon compound is chosen from acryloylamino-acetic acid trans-2-hydroxy-trans-5-[bis-(2-trimethylsiloxy)methylsilanyl-ethyl]-cyclohexyl ester; (2-methyl-acryloylamino)-acetic acid trans-2-hydroxy-trans-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid trans-2-hydroxy-trans-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsilanyl-ethyl)-disiloxanyl]-ethyl}-cyclohexyl ester; (2-methyl-acryloylamino)-acetic acid trans-2-hydroxy-trans-5-{2-[1,1,3,3-tetramethyl-3-(2-trimethylsilanyl-ethyl)-disiloxanyl]-ethyl}-cyclohexyl ester; acryloylamino-acetic acid trans-2-hydroxy-trans-5-{2-[dimethyl-(2-trimethylsilanyl-ethyl)-silanyl]-ethyl}-cyclohexyl ester; and (2-methyl-acryloylamino)-acetic acid trans-2-hydroxy-trans-5-{2-[dimethyl-(2-trimethylsilanyl-ethyl)-silanyl]-ethyl}-cyclohexyl ester; and acryloylamino-acetic acid trans-2-hydroxy-trans-5-[2-(2,4,4,6,6-pentamethyl-[1,3,5,2,4,6]trioxatrisilinan-2-yl)-ethyl]-cyclohexyl ester or a combination of two or more thereof.

21. The composition of claim 13, wherein the addition catalyst of step (b) is a titanium tetraalkoxide.

22. The composition of claim 1, wherein the composition further comprises at least one co-monomer containing an activated carbon-carbon double bond chosen from methyl methacrylate, ethyl methacrylate, butyl methacrylate, 2-ethylhexyl acrylate, cyclohexyl methacrylate, methyl acrylate, 2-hydroxyethyl methacrylate (HEMA), N-vinylpyrrolidone (NVP), methacrylic acid (MA), dimethylacrylamide (DMA), and mixtures of two or more thereof.

23. The composition of claim 1, wherein the composition further comprises at least one co-monomer selected from N-vinyl-pyrrolidone; N-vinyl-caprolactam; N-vinyl-acetamide; N-vinyl-formamide; N-vinyl-isopropylamide; vinyl benzene; vinyl naphthalene; vinyl pyridine; vinyl alcohol; vinyl containing silicones, and combinations of two or more thereof.

24. The composition of claim 1, wherein the composition further comprises at least one co-monomer selected from 3-[tris(trimethylsiloxy)silyl]propyl methacrylate; methyl di(trimethylsiloxy)-silyl propyl glycerol methacrylate; 3-(trimethylsilyl)propyl vinyl carbonate; 3-(vinyloxycarbonylthio)propyl-[tris(trimethylsiloxy)silane]; 3-[tris(tri-methylsiloxy)silyl]propyl vinyl carbamate; 3-[tris(trimethylsiloxy)silyl]propyl allyl carbamate; 3-[tris(trimethylsiloxy)silyl]propyl vinyl carbonate, or a combination of two or more thereof.

25. The composition of claim 1, wherein the composition further comprises at least one crosslinker chosen from ethylene glycol diacrylate, ethylene glycol dimethacrylate, propylene glycol diacrylate, propylene glycol dimethacrylate, 1,4-butylene glycol dimethacrylate, ethylene glycol dicrotonate, diethylene glycol dimethacrylate, diethylene glycol diacrylate, dipropylene glycol dimethacrylate, dipropylene glycol diacrylate, trimethylene glycol diacrylate, triethylene glycol dimethacrylate, triethylene glycol dicrotonate, tetraethylene glycol dimethacrylate, hexaethylene glycol dimethacrylate, tripropylene glycol diacrylate, tripropylene glycol dimethacrylate, tetrapropylene glycol dimethacrylate, tributylene glycol dimethacrylate, tetrabutylene glycol dimethacrylate, hexamethylene glycol dimethacrylate, octamethylene glycol dimethacrylate, decamethylene glycol dimethacrylate, allyl methacrylate, divinylbenzene, diallyl phthalate, trimethylolpropane trimethacrylate, diallyl tartrate, diallyl maleate, triallylmelamine, N,N'-methylenebisacrylamide, divinyl citraconate, diallyl fumarate, divinyl sulfone, triallyl phosphite, diallyl benzenephosphonate, hexahydro-1,3,5-triacryltriazine, divinyl ether, triallyl citrate, polysiloxanylbis(alkylglycerol acrylate), polysiloxanylbis(alkylglycerol methacrylate), or combination of two or more thereof.

26. The composition of claim 1, wherein the composition further comprises a thermal or a photo initiator chosen from 2,2'-azobis (2,4-dimethylpentanenitrile), 2,2'-azobis (2-methylpropanenitrile), 2,2'-azobis (2-methylbutanenitrile), peroxides such as benzoyl peroxide, benzoin methyl ether, diethoxyacetophenone, a benzoylphosphine oxide, 2-hydroxy-2-methyl propiophenone (HMPP), 1-hydroxycyclohexyl phenyl ketone and Darocur and Irgacure types, or combination of two or more thereof.

27. The composition of claim 22, wherein the ratio of alpha, beta-unsaturated amido-containing organosilicon compound to the at least one co-monomer containing an activated carbon-carbon double bond is from 1:2 to 2:1.

28. The composition of claim 22, wherein the composition comprises from 40 to 60 weight percent alpha, beta-unsaturated amido-containing organosilicon compound and the at least one co-monomer containing an activated carbon-carbon double bond comprises 20 to 30 weight percent dimethylacrylamide, 15 to 25 weight percent 2-hydroxyethyl (meth)acrylate, 1 to 10 weight percent N-vinyl pyrolidone and 0.1 to 3 weight percent of ethylene glycol dimethyl acrylate, based on the total weight of trisiloxane containing 3-(meth)acryloxy-substituted (hydroxycyclohexyl)ethyl group of the present invention, dimethylacrylamide, 2-hydroxyethyl (meth)acrylate, N-vinyl pyrroline and ethylene glycol dimethyl acrylate.

29. A contact lens comprising a hydrogel film formed from the composition of claim 1.

30. The contact lens of claim 29, wherein the hydrogel film is prepared from at least one alpha, beta-unsaturated amido-containing organosilicon compound chosen from (acryloylamino)-acetic acid 2-hydroxy-5-[2-bis-(trimethylsiloxy)methylsilanyl-ethyl]-cyclohexyl ester; 3-(acryloylamino)-propionic acid 2-hydroxy-5-[2-bis-(trimethylsiloxy)methylsilanyl-ethyl]-cyclohexyl ester; (2-methylacryloylamino)-acetic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 9-(2-methyl-acryloylamino)-nonanoic acid 2-hydroxy-5-[2-bis-(trimethylsiloxy)methylsilanyl-ethyl]-cyclohexyl ester; 2-methyl-acrylic acid 2-hydroxy-5-bis-(trimethylsiloxy)methylsilanyl-cyclohexyl ester; 9-(3-methoxycarbonyl-acryloylamino)-nonanoic acid 2-hydroxy-5-[3-bis-(trimethylsiloxy)methylsilanyl-propyl]-cyclohexyl ester; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid; 3-{2-[2-hydroxy-5-[2-bis-(trimethylsiloxy)methylsilanyl-ethyl]-cyclohexyloxycarbonyl]-ethylcarbamoyl}-acrylic acid methyl ester; 3-{2-[2-hydroxy-5-[bis-(3-trimethylsiloxy)methylsilanyl-propyl]-cyclohexyloxycarbonyl]-ethylcarbamoyl}-acrylic acid methyl ester; acryloylamino-acetic acid 2-hydroxy-5-[2-tris-(trimethylsiloxy)silanyl-ethyl]-cyclohexyl ester; 3-(acryloylamino)-propionic acid 2-hydroxy-5-[2-tris-(trimethylsiloxy)silanyl-ethyl]-cyclohexyl ester; (2-methyl-acryloylamino)-acetic acid 2-hydroxy-5-[2-tris-(trimethylsiloxy)silanyl-ethyl]-cyclohexyl ester; 2-methyl-acrylic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(2-methyl-acryloylamino)-nonanoic acid 2-hydroxy-5-[2-tris-(trimethylsiloxy)silanyl-ethyl]-cyclohexyl ester; 9-(3-methoxycarbonyl-acryloylamino)-nonanoic acid 2-hydroxy-5-[3-tris-(trimethylsiloxy)silanyl-propyl]-cyclohexyl ester; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid; 3-{2-[2-hydroxy-5-[2-tris-(trimethylsiloxy)silanyl-ethyl]-cyclohexyloxycarbonyl]-ethylcarbamoyl}-acrylic acid methyl ester; 3-{2-[2-hydroxy-5-[3-tris-(trimethylsiloxy)silanyl-propyl]-cyclohexyloxycarbonyl]-ethylcarbamoyl}-acrylic acid methyl ester; acryloylamino-acetic acid 2-hydroxy-5-{2-[1,1,3,3-tetramethyl-3-(2-trimethylsilanyl-ethyl)-disiloxanyl]-ethyl}cyclohexyl ester; (2-methylacryloylamino)-acetic acid 2-hydroxy-5-{2-[1,1,3,3-tetramethyl-3-(2-trimethylsilanyl-ethyl)-disiloxanyl]-ethyl}cyclohexyl ester; acryloylamino-acetic acid 2-hydroxy-5-{2-[dimethyl-(2-trimethylsilanyl-ethyl)-silanyl]-ethyl}-cyclohexyl ester; (2-methylacryloylamino)-acetic acid 2-hydroxy-5-{2-[dimethyl-(2-trimethylsilanyl-ethyl)-silanyl]-ethyl}-cyclohexyl ester; acryloylamino-acetic acid 2-hydroxy-5-[2-(2,4,4,6,6-pentamethyl-[1,3,5,2,4,6]trioxatrisilinan-2-yl)-ethyl]-cyclohexyl ester; (2-methyl-acryloylamino-acetic acid 2-hydroxy-5-[2-(2,4,4,6,6-pentamethyl-[1,3,5,2,4,6]trioxatrisilinan-2-yl)-ethyl]-cyclohexyl ester; acryloylamino-acetic acid 5-[2-(2,4,4,6,6,8,8-heptamethyl-

[1,3,5,7,2,4,6,8]tetroxatetrasilocan-2-yl)-ethyl]-2-hydroxy-cyclohexyl ester, (2-methyl-acryloylamino)-acetic acid 5-[2-(2,4,4,6,6,8,8-heptamethyl-[1,3,5,7,2,4,6,8]tetroxatetrasilocan-2-yl)-ethyl]-2-hydroxy-cyclohexyl ester; acryloylamino-acetic acid 4-[dimethyl-(2-trimethylsilanyl-ethyl)-silanyl]-2-hydroxy-cyclohexyl ester, acryloylamino-acetic acid 4-[1,1,3,3-tetramethyl-3-(2-trimethylsilanyl-ethyl)-disiloxanyl]-2-hydroxy-cyclohexyl ester; acryloylamino-acetic acid 4-[2,4,4,6,6,8,8-heptamethyl-[1,3,5,7,2,4,6,8]tetroxatetrasilocan-2-yl]-2-hydroxy-cyclohexyl ester; and acryloylamino-acetic acid 4-[tris-(trimethylsiloxy)silanyl]-2-hydroxy-cyclohexyl ester, or a combination of two or more thereof.

31. The contact lens of claim 29, wherein the alpha, beta-unsaturated amido-containing organosilicon compound has the stereochemistry in which the alpha, beta-unsaturated amido group and the silyl group is in a trans-1,3-substitution on the cycloalkylene linking group and having the stereochemistry of Formula (II):

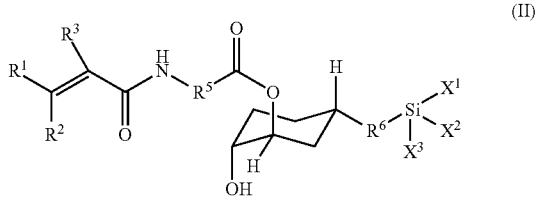

wherein:
$R^1$, $R^2$, and $R^3$ are independently chosen from hydrogen, an alkyl group containing from 1 to 3 carbon atoms, a phenyl group, or $R^7C(=O)OR^8$, wherein $R^7$ is a chemical bond or an alkylene group containing from 1 to 6 carbon atoms, and $R^8$ is hydrogen or an alkyl group of from 1 to 3 carbon atoms;

$R^4$ is hydrogen or an alkyl group containing from 1 to 6 carbon atoms or phenyl;

$R^5$ is an alkylene group containing from 1 to 16 carbon atoms and optionally a heteroatom of oxygen, sulfur, nitrogen, or a combination of two or more thereof;

$R^6$ is a chemical bond or an alkylene group containing from 1 to 16 carbon atoms and optionally a heteroatom of oxygen, sulfur or nitrogen;

$X^1$ is a methyl, trimethylsiloxy, or $-O[Si(CH_3)_2O-]_n$, wherein n is an integer of from 1 to 9;

$X^2$ is methyl, trimethylsiloxy or $-[OSi(CH_3)_2]_mG^1$, wherein $G^1$ is $(CH_3)_3SiOSi(CH_3)_2O-$ or $H(CH_3)_2SiO-$ or alpha, beta-unsaturated amido-containing group with the general formula:

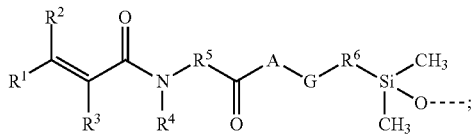

and m is an integer from 0 to 200, with the proviso that when $X^2$ is $-[OSi(CH_3)_2]_mG^2$, then $X^1$ and $X^3$ is methyl;

$X^3$ is methyl, trimethylsiloxy, $(CH_3)_3SiCH_2CH_2-$, $(CH_3)_3SiCH_2CH_2Si(CH_3)_2O-$ or $-OSi(CH_3)_2$, with the provisos that (i) when $X^1$ is $-O[Si(CH_3)_2O-]_n$, then $X^3$ is $-OSi(CH_3)_2$ and $X^1$ forms a chemical bond with the $X^3$ to form a divalent $-X^1-X^3-$ group, which is bonded to the silicon atom to form a cyclic polysiloxane ring, (ii) when $X^3$ is $-OSi(CH_3)_2$, then $X^1$ is $-O[Si(CH_3)_2O-]_n$, and $X^1$ forms a chemical bond with the $X^3$ to form a divalent $-X^1-X^3-$ group, which is bonded to the silicon atom to form a cyclic polysiloxane ring.

32. The contact lens of claim 29, wherein the alpha, beta-unsaturated amido-containing organosilicon compound is chosen from acryloylamino-acetic acid trans-2-hydroxy-trans-5-[bis-(2-trimethylsiloxy)methylsilanyl-ethyl]-cyclohexyl ester; (2-methyl-acryloylamino)-acetic acid trans-2-hydroxy-trans-5-[bis-(2-trimethylsiloxy)methylsilanyl-ethyl]-cyclohexyl ester; acryloylamino-acetic acid 2-hydroxy-5-[tris-(2-trimethylsiloxy)silanyl-ethyl]-cyclohexyl ester; (2-methyl-acryloylamino)-acetic acid trans-2-hydroxy-trans-5-[tris-(2-trimethylsiloxy)methylsilanyl-ethyl]-cyclohexyl ester; acryloylamino-acetic acid 2-hydroxy-5-{2-[1,1,3,3-tetramethyl-3-(2-trimethylsilanyl-ethyl)-disiloxanyl]-ethyl}-cyclohexyl ester; (2-methyl-acryloylamino)-acetic acid trans-2-hydroxy-trans-5-{2-[1,1,3,3-tetramethyl-3-(2-trimethylsilanyl-ethyl)-disiloxanyl]-ethyl}-cyclohexyl ester; acryloylamino-acetic acid trans-2-hydroxy-trans-5-{2-[dimethyl-(2-trimethylsilanyl-ethyl)-silanyl]-ethyl}-cyclohexyl ester; and (2-methyl-acryloylamino)-acetic acid trans-2-hydroxy-trans-5-{2-[dimethyl-(2-trimethylsilanyl-ethyl)-silanyl]-ethyl}-cyclohexyl ester; and acryloylamino-acetic acid trans-2-hydroxy-trans-5-[2-(2,4,4,6,6-pentamethyl-[1,3,5,2,4,6]trioxatrisilinan-2-yl)-ethyl]-cyclohexyl ester, or a combination of two or more thereof.

33. The contact lens of claim 29, wherein the hydrogel film contains at least one co-monomer containing an activated carbon-carbon double bond selected from the group consisting of methyl methacrylate, ethyl methacrylate, butyl methacrylate, 2-ethylhexyl acrylate, cyclohexyl methacrylate, methyl acrylate, 2-hydroxyethyl methacrylate (HEMA), N-vinylpyrrolidone (NVP), methacrylic acid (MA), and dimethylacrylamide (DMA), or a combination of two or more thereof.

34. The contact lens of claim 29, wherein the hydrogel film contains at least one crosslinker selected from the group consisting of ethylene glycol diacrylate, ethylene glycol dimethacrylate, propylene glycol diacrylate, propylene glycol dimethacrylate, 1,4-butylene glycol dimethacrylate, ethylene glycol dicrotonate, diethylene glycol dimethacrylate, diethylene glycol diacrylate, dipropylene glycol dimethacrylate, dipropylene glycol diacrylate, trimethylene glycol diacrylate, triethylene glycol dimethacrylate, triethylene glycol dicrotonate, tetraethylene glycol dimethacrylate, hexaethylene glycol dimethacrylate, tripropylene glycol diacrylate, tripropylene glycol dimethacrylate, tetrapropylene glycol dimethacrylate, tributylene glycol dimethacrylate, tetrabutylene glycol dimethacrylate, hexamethylene glycol dimethacrylate, octamethylene glycol dimethacrylate, decamethylene glycol dimethacrylate, allyl methacrylate, divinylbenzene, diallyl phthalate, trimethylolpropane trimethacrylate, diallyl tartrate, diallyl maleate, triallylmelamine, N,N'-methylenebisacrylamide, divinyl citraconate, diallyl fumarate, divinyl sulfone, triallyl phosphite, diallyl benzenephosphonate, hexahydro-1,3,5-triacryltriazine, divinyl ether, triallyl citrate, polysiloxanylbis(alkylglycerol acrylate) and polysiloxanylbis(alkylglycerol methacrylate), or a combination of two or more thereof.

35. The contact lens claim 33, wherein the hydrogel film is made from co-monomers having the ratio of alpha, beta-unsaturated amido-containing organosilicon compound to the at least one co-monomer containing an activated carbon-carbon double bond of from 1:2 to 2:1.

36. The contact lens of claim 33 wherein the hydrogel film is made from co-monomers where the alpha, beta-unsaturated amido-containing organosilicon compound is from 40 to 100 weight percent and the at least one co-monomer containing an activated carbon-carbon double bond comprises from 10 to 30 weight percent dimethylacrylamide, 0 to 25 weight percent 2-hydroxyethyl (meth)acrylate, 0 to 10 weight percent N-vinyl pyrroline and 0.1 to 3 weight percent of ethylene glycol dimethyl acrylate, based on the total weight of trisiloxane containing 3-(meth)acryloxy-substituted (hydroxycyclohexyl)ethyl group of the present invention, dimethylacrylamide, 2-hydroxyethyl (meth)acrylate, N-vinyl pyrroline and ethylene glycol dimethyl acrylate.

37. The composition according to claim 1, wherein the composition is a film forming additive in textile, paper, leather, personal care, home care, coating, painting and seed treatment formulations.

* * * * *